US011917467B2

(12) United States Patent
Raghavan et al.

(10) Patent No.: US 11,917,467 B2
(45) Date of Patent: Feb. 27, 2024

(54) TECHNIQUES FOR EXCHANGING ULTRA-WIDE BANDWIDTH BEAMFORMING INFORMATION

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

(*) Notice: Subject to any disclaimer, the term of this patent is extended or adjusted under 35 U.S.C. 154(b) by 157 days.

(21) Appl. No.: 17/483,897

(22) Filed: Sep. 24, 2021

(65) Prior Publication Data
US 2022/0104085 A1    Mar. 31, 2022

Related U.S. Application Data

(60) Provisional application No. 63/085,046, filed on Sep. 29, 2020.

(51) Int. Cl.
*H04W 36/24* (2009.01)
*H04W 36/00* (2009.01)
*H04B 17/318* (2015.01)

(52) U.S. Cl.
CPC .... *H04W 36/00837* (2018.08); *H04B 17/318* (2015.01); *H04W 36/0072* (2013.01); *H04W 36/24* (2013.01)

(58) Field of Classification Search
CPC ....... H04W 36/00837; H04W 36/0072; H04W 36/24; H04W 36/36; H04B 17/318
See application file for complete search history.

(56) References Cited

U.S. PATENT DOCUMENTS

| | | | |
|---|---|---|---|
| 2010/0157941 A1* | 6/2010 | Raghothaman | H04W 36/00837 370/331 |
| 2014/0086213 A1* | 3/2014 | Kwon | H04W 56/0005 370/331 |
| 2015/0181560 A1* | 6/2015 | Jamadagni | H04W 4/70 370/329 |
| 2015/0201326 A1* | 7/2015 | Kazmi | H04W 8/24 370/329 |
| 2017/0303278 A1* | 10/2017 | Calin | H04B 7/022 |

(Continued)

*Primary Examiner* — Atique Ahmed
(74) *Attorney, Agent, or Firm* — Holland & Hart LLP

(57) ABSTRACT

Methods, systems, and devices for wireless communications are described. Devices in a wireless communications system may exchange information related to one or more default operating frequencies. A wireless device may identify default operating frequencies within an ultra-wide bandwidth and transmit an indication of the default operating frequencies to one or more other wireless devices. A first wireless device may identify one or more default operating frequencies of a second device (e.g., a user equipment (UE)), and the first wireless device may provide the default operating frequencies of the UE to another wireless device. For example, a UE may be handed over from a source device to a target device, and the source device may provide the UE's default operating frequencies to the target device when handing over the UE to the target device. The UE and the target device may communicate over the bandwidth based on the default operating frequencies.

30 Claims, 12 Drawing Sheets

(56) References Cited

U.S. PATENT DOCUMENTS

| | | | |
|---|---|---|---|
| 2019/0082456 A1* | 3/2019 | Kim | H04L 27/2602 |
| 2019/0215738 A1* | 7/2019 | Halbauer | H04W 36/0069 |
| 2019/0215862 A1* | 7/2019 | Kim | H04W 74/0841 |
| 2019/0357025 A1* | 11/2019 | Hwang | H04W 4/025 |
| 2020/0053601 A1* | 2/2020 | Wu | H04W 36/0058 |
| 2020/0229206 A1* | 7/2020 | Badic | H04W 40/24 |
| 2020/0337054 A1* | 10/2020 | Kwok | H04W 48/18 |
| 2021/0296785 A1* | 9/2021 | Zimmerman | H01Q 21/062 |
| 2022/0038249 A1 | 2/2022 | Raghavan et al. | |

* cited by examiner

TECHNIQUES FOR EXCHANGING ULTRA-WIDE BANDWIDTH BEAMFORMING INFORMATION

CROSS REFERENCE

The present application for patent claims the benefit of U.S. Provisional Patent Application No. 63/085,046 by RAGHAVAN et al., entitled "TECHNIQUES FOR EXCHANGING ULTRA-WIDE BANDWIDTH BEAMFORMING INFORMATION," filed Sep. 29, 2020, assigned to the assignee hereof, and expressly incorporated by reference herein.

FIELD OF TECHNOLOGY

The present disclosure relates to wireless communications, including techniques for exchanging ultra-wide bandwidth beamforming information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support beamformed communications using one or multiple antenna arrays. However, communications performance over some frequency ranges may, in some cases, be affected by a configuration of a UE's antenna array.

SUMMARY

The described techniques relate to improved methods, systems, devices, and apparatuses that support techniques for exchanging ultra-wide bandwidth beamforming information. Generally, the described techniques enable devices in a wireless communications system to exchange information related to one or more default operating frequencies of the respective devices. For example, a wireless device may identify one or more default operating frequencies within an ultra-wide bandwidth and transmit an indication of the default operating frequencies to one or more other wireless devices. Additionally or alternatively, a first wireless device (e.g., a base station or transmission/reception point (TRP)) may identify one or more default operating frequencies of a second device (e.g., a user equipment (UE)), and the first wireless device may provide the default operating frequencies of the second wireless device to one or more other wireless devices in the system. For example, a UE may be handed over from a source TRP to a target TRP, and the source TRP and the UE may exchange default operating frequency information with one another. The source TRP may also provide the UE's default operating frequencies to the target TRP, for example, when handing over the UE to the target TRP. As such, the target TRP may identify the default operating frequencies that facilitate efficient communication with the UE. The UE and the target TRP may thus communicate over an ultra-wide bandwidth based on the default operating frequencies.

In some examples, the default operating frequency information for the UE may be transmitted from the source TRP to the target TRP using a handover message (e.g., a conditional handover message) or other signaling. The target TRPs receiving the indication of the default operating frequencies of another wireless device (e.g., the UE) may, in turn, adjust communications parameters according to the indicated default operating frequencies. The default operating frequencies for the various wireless devices may be device-specific and may be based on a hardware configuration of a device (e.g., a number of radio frequency (RF) chains, antenna element spacing, or the like).

A method of wireless communication at a first wireless device is described. The method may include identifying, by the first wireless device, one or more default operating frequencies of a second wireless device, the one or more default operating frequencies for communications over respective portions of a bandwidth and associated with an antenna array configuration of the second wireless device, transmitting, to a third wireless device, a message including an indication of the one or more default operating frequencies of the second wireless device, and performing a handover of the second wireless device from the first wireless device to the third wireless device based on one or more handover conditions being satisfied, where the message including the indication of the one or more default operating frequencies is transmitted to the third wireless device based on performing the handover.

An apparatus for wireless communication at a first wireless device is described. The apparatus may include a processor, memory coupled with the processor, and instructions stored in the memory. The instructions may be executable by the processor to cause the apparatus to identify, by the first wireless device, one or more default operating frequencies of a second wireless device, the one or more default operating frequencies for communications over respective portions of a bandwidth and associated with an antenna array configuration of the second wireless device, transmit, to a third wireless device, a message including an indication of the one or more default operating frequencies of the second wireless device, and perform a handover of the second wireless device from the first wireless device to the third wireless device based on one or more handover conditions being satisfied, where the message including the indication of the one or more default operating frequencies is transmitted to the third wireless device based on performing the handover.

Another apparatus for wireless communication at a first wireless device is described. The apparatus may include means for identifying, by the first wireless device, one or more default operating frequencies of a second wireless device, the one or more default operating frequencies for communications over respective portions of a bandwidth and associated with an antenna array configuration of the second wireless device, transmitting, to a third wireless device, a message including an indication of the one or more default operating frequencies of the second wireless device, and performing a handover of the second wireless device from the first wireless device to the third wireless device based on one or more handover conditions being satisfied, where the message including the indication of the one or more default operating frequencies is transmitted to the third wireless device based on performing the handover.

A non-transitory computer-readable medium storing code for wireless communication at a first wireless device is described. The code may include instructions executable by a processor to identify, by the first wireless device, one or more default operating frequencies of a second wireless device, the one or more default operating frequencies for communications over respective portions of a bandwidth and associated with an antenna array configuration of the second wireless device, transmit, to a third wireless device, a message including an indication of the one or more default operating frequencies of the second wireless device, and perform a handover of the second wireless device from the first wireless device to the third wireless device based on one or more handover conditions being satisfied, where the message including the indication of the one or more default operating frequencies is transmitted to the third wireless device based on performing the handover.

Some examples of the method, apparatuses, and non-transitory computer-readable medium described herein may further include operations, features, means, or instructions for identifying one or more default operating frequencies of the first wireless device, the one or more default operating frequencies of the first wireless device used for communicating over the respective portions of the bandwidth and associated with an antenna array configuration of the first wireless device, and transmitting, to the third wireless device, a second message including an indication of the one or more default operating frequencies of the first wireless device.

Some examples of the method, apparatuses, and non-transitory computer-readable medium described herein may further include operations, features, means, or instructions for identifying a trigger for transmitting the second message including the indication of the one or more default operating frequencies of the first wireless device, where transmitting the second message may be based on the trigger being satisfied.

In some examples of the method, apparatuses, and non-transitory computer-readable medium described herein, the trigger includes a startup event at the first wireless device, activating the first wireless device, restarting the first wireless device, one or more time periods of a predetermined schedule, one or more time periods of a semi-persistent schedule, or any combination thereof.

Some examples of the method, apparatuses, and non-transitory computer-readable medium described herein may further include operations, features, means, or instructions for identifying a configuration of a protocol for exchanging default operating frequencies with the third wireless device, where transmitting the second message may be based on the protocol.

In some examples of the method, apparatuses, and non-transitory computer-readable medium described herein, the one or more default operating frequencies of the first wireless device indicate the antenna array configuration of the first wireless device, the antenna array configuration including an inter-antenna element spacing of an antenna array having uniformly-spaced antenna elements or non-uniformly-spaced antenna elements, where the inter-antenna element spacing of the antenna array may be in azimuth, in elevation, or any combination thereof.

In some examples of the method, apparatuses, and non-transitory computer-readable medium described herein, identifying the one or more default operating frequencies of the first wireless device may include operations, features, means, or instructions for identifying a first frequency boundary and a second frequency boundary for each default operating frequency of the one or more default operating frequencies of the first wireless device, the first frequency boundary being different from the second frequency boundary, where the indication of the one or more default operating frequencies of the first wireless device includes an indication of at least the first frequency boundary, or the second frequency boundary, or both.

In some examples of the method, apparatuses, and non-transitory computer-readable medium described herein, the first frequency boundary includes an upper frequency boundary and the second frequency boundary includes a lower frequency boundary, and where one or more frequencies within the upper frequency boundary and the lower frequency boundary provide beamforming performance that satisfies a performance threshold, the performance threshold based on a signal strength threshold for communications over each of the one or more frequencies.

In some examples of the method, apparatuses, and non-transitory computer-readable medium described herein, performing the handover of the second wireless device may include operations, features, means, or instructions for performing a conditional handover of the second wireless device from the first wireless device to the third wireless device, the conditional handover being based on the one or more handover conditions being satisfied, where the message includes a conditional handover message.

Some examples of the method, apparatuses, and non-transitory computer-readable medium described herein may further include operations, features, means, or instructions for receiving, from the second wireless device, a second message indicating the one or more default operating frequencies of the second wireless device, where identifying the one or more default operating frequencies of the second wireless device may be based on receiving the second message.

In some examples of the method, apparatuses, and non-transitory computer-readable medium described herein, the second message includes an indication of a range of default operating frequencies of the second wireless device.

Some examples of the method, apparatuses, and non-transitory computer-readable medium described herein may further include operations, features, means, or instructions for receiving, from the third wireless device, a third message including an indication of one or more default operating frequencies of the third wireless device, and identifying the one or more default operating frequencies of the third wireless device based on the third message, where the one or more default operating frequencies of the third wireless device may be associated with an antenna array configuration of the third wireless device, or one or more carrier frequencies associated with an analog beamforming codebook of the third wireless device, or a frequency band from a set of frequency bands, or a channel from a set of channels, or any combination thereof.

In some examples of the method, apparatuses, and non-transitory computer-readable medium described herein, each default operating frequency of the one or more default operating frequencies of the second wireless device includes a frequency such that substantially half of a wavelength corresponding to the frequency may be substantially equal to a spacing between two or more antenna elements of an antenna array of the second wireless device.

In some examples of the method, apparatuses, and non-transitory computer-readable medium described herein, the spacing between the two or more antenna elements of the antenna array of the second wireless device may be within an upper threshold and a lower threshold that may be associated with substantially half of the wavelength of the frequency.

In some examples of the method, apparatuses, and non-transitory computer-readable medium described herein, the first wireless device or the third wireless device, or both, includes a base station, an IAB node, or a TRP, and the second wireless device includes a UE, or a customer premises equipment, or a sidelink node, or a wireless repeater configured for retransmissions.

A method of wireless communication at a first wireless device is described. The method may include receiving, from a second wireless device, a message including an indication of one or more default operating frequencies of a third wireless device, the one or more default operating frequencies for communications over respective portions of a bandwidth and associated with an antenna array configuration of the third wireless device, performing a handover of the third wireless device from the second wireless device to the first wireless device based on one or more handover conditions being satisfied, where receiving the message including the indication of the one or more default operating frequencies of the third wireless device is based on performing the handover, and communicating with the third wireless device over the bandwidth based on the one or more default operating frequencies of the third wireless device.

An apparatus for wireless communication at a first wireless device is described. The apparatus may include a processor, memory coupled with the processor, and instructions stored in the memory. The instructions may be executable by the processor to cause the apparatus to receive, from a second wireless device, a message including an indication of one or more default operating frequencies of a third wireless device, the one or more default operating frequencies for communications over respective portions of a bandwidth and associated with an antenna array configuration of the third wireless device, perform a handover of the third wireless device from the second wireless device to the first wireless device based on one or more handover conditions being satisfied, where receiving the message including the indication of the one or more default operating frequencies of the third wireless device is based on performing the handover, and communicate with the third wireless device over the bandwidth based on the one or more default operating frequencies of the third wireless device.

Another apparatus for wireless communication at a first wireless device is described. The apparatus may include means for receiving, from a second wireless device, a message including an indication of one or more default operating frequencies of a third wireless device, the one or more default operating frequencies for communications over respective portions of a bandwidth and associated with an antenna array configuration of the third wireless device, performing a handover of the third wireless device from the second wireless device to the first wireless device based on one or more handover conditions being satisfied, where receiving the message including the indication of the one or more default operating frequencies of the third wireless device is based on performing the handover, and communicating with the third wireless device over the bandwidth based on the one or more default operating frequencies of the third wireless device.

A non-transitory computer-readable medium storing code for wireless communication at a first wireless device is described. The code may include instructions executable by a processor to receive, from a second wireless device, a message including an indication of one or more default operating frequencies of a third wireless device, the one or more default operating frequencies for communications over respective portions of a bandwidth and associated with an antenna array configuration of the third wireless device, perform a handover of the third wireless device from the second wireless device to the first wireless device based on one or more handover conditions being satisfied, where receiving the message including the indication of the one or more default operating frequencies of the third wireless device is based on performing the handover, and communicate with the third wireless device over the bandwidth based on the one or more default operating frequencies of the third wireless device.

Some examples of the method, apparatuses, and non-transitory computer-readable medium described herein may further include operations, features, means, or instructions for modifying a configuration of one or more communications parameters for the third wireless device based on the one or more default operating frequencies of the third wireless device, the one or more communications parameters including a modulation and coding scheme, a transmission power, or any combination thereof, and transmitting, to the third wireless device, an indication of the modified configuration.

Some examples of the method, apparatuses, and non-transitory computer-readable medium described herein may further include operations, features, means, or instructions for identifying one or more default operating frequencies of the first wireless device, the one or more default operating frequencies of the first wireless device used for communicating over the respective portions of the bandwidth and associated with an antenna array configuration of the first wireless device, and transmitting, to the second wireless device, a second message indicating the one or more default operating frequencies of the first wireless device.

Some examples of the method, apparatuses, and non-transitory computer-readable medium described herein may further include operations, features, means, or instructions for identifying a trigger for transmitting the second message including the indication of the one or more default operating frequencies of the first wireless device, where transmitting the second message may be based on the trigger being satisfied.

In some examples of the method, apparatuses, and non-transitory computer-readable medium described herein, the trigger includes a startup event at the first wireless device, activating the first wireless device, restarting the first wireless device, one or more time periods of a predetermined schedule, one or more time periods of a semi-persistent schedule, or any combination thereof.

Some examples of the method, apparatuses, and non-transitory computer-readable medium described herein may further include operations, features, means, or instructions for identifying a configuration of a protocol for exchanging default operating frequencies with the second wireless device, where transmitting the second message may be based on the protocol.

In some examples of the method, apparatuses, and non-transitory computer-readable medium described herein, the one or more default operating frequencies of the first wireless device indicate the antenna array configuration of the first wireless device, the antenna array configuration including an inter-antenna element spacing of an antenna array having uniformly-spaced antenna elements or non-uniformly-spaced antenna elements, where the inter-antenna element spacing of the antenna array may be in azimuth, in elevation, or any combination thereof.

In some examples of the method, apparatuses, and non-transitory computer-readable medium described herein, identifying the one or more default operating frequencies of the first wireless device may include operations, features, means, or instructions for identifying a first frequency boundary and a second frequency boundary for each default operating frequency of the one or more default operating frequencies of the first wireless device, the first frequency boundary being different from the second frequency boundary, where the indication of the one or more default operating frequencies of the first wireless device includes an indication of at least the first frequency boundary, or the second frequency boundary, or both.

In some examples of the method, apparatuses, and non-transitory computer-readable medium described herein, the first frequency boundary includes an upper frequency boundary and the second frequency boundary includes a lower frequency boundary, and one or more frequencies within the upper frequency boundary and the lower frequency boundary provide beamforming performance that satisfies a performance threshold, the performance threshold based on a signal strength threshold for communications over each of the one or more frequencies.

In some examples of the method, apparatuses, and non-transitory computer-readable medium described herein, performing the handover of the third wireless device may include operations, features, means, or instructions for performing a conditional handover of the third wireless device from the second wireless device to the first wireless device, the conditional handover based on the one or more handover conditions being satisfied, where the message includes a conditional handover message.

Some examples of the method, apparatuses, and non-transitory computer-readable medium described herein may further include operations, features, means, or instructions for receiving, from the third wireless device, a second message including an indication of the one or more default operating frequencies of the third wireless device, and identifying the one or more default operating frequencies of the third wireless device based on receiving the second message.

In some examples of the method, apparatuses, and non-transitory computer-readable medium described herein, the second message includes an indication of a range of default operating frequencies of the third wireless device.

DETAILED DESCRIPTION

Figure 1:
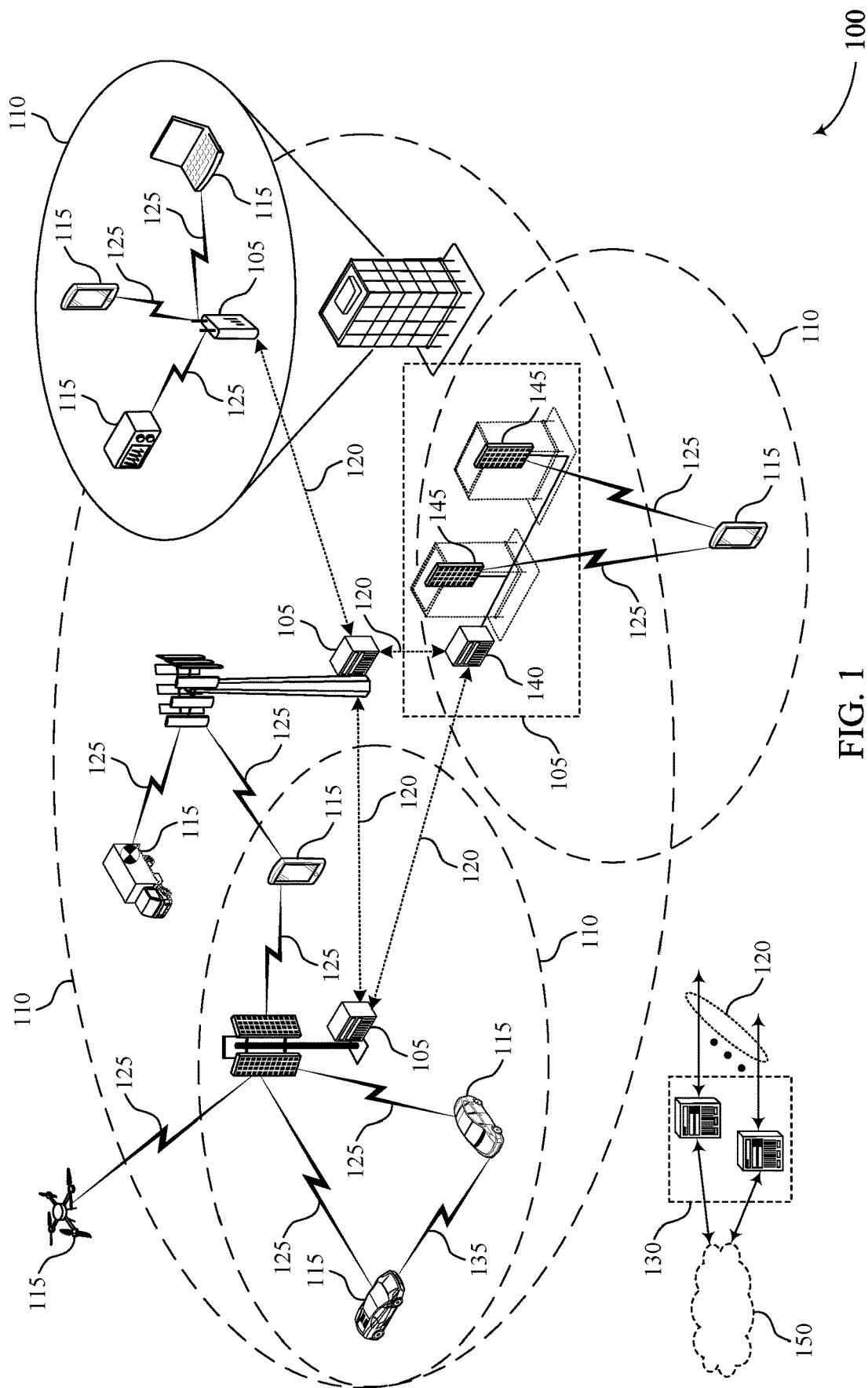
FIG. 1 illustrates an example of a wireless communications system that supports techniques for exchanging ultra-wide bandwidth beamforming information in accordance with aspects of the present disclosure.

Some wireless communications systems may support wireless communications in relatively high frequency ranges, such as in frequency range 4 (FR4) (e.g., including 52.6 gigahertz (GHz)-114.25 GHz bands), which may be referred to as upper millimeter wave (mmW) bands, a sub-THz regime, or the like. Communications in such frequency ranges may utilize an ultra-wide bandwidth (e.g., a 14 GHz bandwidth, a 25 GHz bandwidth, a bandwidth greater than 3 GHz, or the like), which may enable enhanced communications performance at the corresponding frequencies. In such examples, the communications within an ultra-wide bandwidth may be associated with a channelization of the ultra-wide bandwidth, where respective portions or channels of the ultra-wide bandwidth may be used for communications between devices. In particular, a 14 GHz ultra-wide bandwidth may be available for communications between a user equipment (UE) and a base station, but only a portion of the ultra-wide bandwidth (e.g., a 2 GHz or 3 GHz channel) may be allocated for some communications between the devices.

However, a wireless device may be optimized for performance at a specific frequency—which may be referred to as a default operating frequency—and different devices communicating within a system may not have the same default operating frequency. Additionally, within an ultra-wide bandwidth, wireless devices may use a number of different channels (e.g., the 2 GHz or 3 GHz channels at different radio frequency (RF) spectrum bands) for communications, and in some cases may switch channels across the ultra-wide bandwidth. However, a device switching to a different channel may also need to update a beamforming codebook in accordance with the frequencies of the new channel, which may introduce latency and other inefficiencies. If, instead, a device re-uses a beamforming codebook across different channels within the ultra-wide bandwidth, performance may degrade at the device (e.g., rate control issues, decoding failures, or the like) due to beam squinting at the corresponding frequencies.

To avoid inefficiency and performance degradation when using an ultra-wide bandwidth, and as described herein, multiple wireless devices within a system may exchange default operating frequency information and may adjust one or more communications parameters accordingly. For example, a wireless device may identify one or more default operating frequencies within an ultra-wide bandwidth and may transmit an indication of the default operating frequencies to one or more other wireless devices. The default operating frequencies may be device-specific and may be based on a hardware configuration (e.g., a number of RF chains, an antenna array configuration, an antenna element spacing within an antenna panel) for communications over portions of a bandwidth (e.g., an ultra-wide bandwidth). As an example, a first TRP may handover a UE to a second TRP. The first TRP may identify one or more default operating frequencies of the UE and may transmit such information to the second TRP. The second TRP may use the default operating frequency information to communicate with the UE after the handover. Providing the second TRP with the default operating frequencies of the UE may enable relatively more efficient communications between the two devices over the bandwidth. For example, a mismatch between the UE and the target TRP's respective default operating frequencies may result in beamforming loss during communications between the two devices. However, the second TRP may avoid or reduce such loss by adjusting one or more communications parameters according to the default operating frequency information. In addition, wireless devices (e.g., a base station or TRP) may exchange default operating frequency information with other devices in a system (e.g., other base stations or TRPs), thereby establishing a network of devices that each have information related to the device-specific default operating frequencies utilized in the system. In addition, default operating frequencies may be antenna port, RF chain, or array-specific, where a wireless device may have one or multiple default operating frequencies in the ultra-wide bandwidth based on, for example, its antenna configuration.

In some examples, a range or upper and lower bounds of each default operating frequency may be indicated between wireless devices, and the devices may adjust one or more communications parameters based on the upper and lower bounds. Here, the upper and lower bounds may indicate the frequencies at which communications performance may be achieved in accordance with some performance threshold (e.g., based on a predetermined signal strength threshold(s) (both upper and lower thresholds) for transmissions within the bounds). Selecting or adjusting parameters based on the one or more default operating frequencies may provide for more efficient communications between devices, and may reduce array gain deterioration due to beam shape distortion or beam squinting. Likewise, the enhanced communications performance obtained through sharing default operating frequencies may provide for relatively increased throughput and higher reliability, thereby enhancing user experience.

Aspects of the disclosure are initially described in the context of wireless communications systems. Aspects of the disclosure are then illustrated by a process flow. Aspects of the disclosure are further illustrated by and described with reference to apparatus diagrams, system diagrams, and flowcharts that relate to techniques for exchanging ultra-wide bandwidth beamforming information.

FIG. 1 illustrates an example of a wireless communications system 100 that supports techniques for exchanging ultra-wide bandwidth beamforming information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 GHz. Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). In addition, a frequency range designation of FR4 (e.g., 52.6 GHz-114.25 GHz bands) may also be referred to as "upper millimeter wave bands," or a "sub-THz regime," or some other terminology. The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band, the 2.4 GHz band, the 60 GHz band, the 2.6 GHz band, and/or the 900 MHz band. The unlicensed spectrum may also include other frequency bands. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, one or more UEs 115 and base stations 105 may communicate in an ultra-wide bandwidth (e.g., a 14 GHz bandwidth, a 25 GHz bandwidth, or some bandwidth that is greater than 3 GHz). Within the ultra-wide bandwidth, the UEs 115 and base stations 105 may communicate over a number of different channels (e.g., 2 GHz or 3 GHz channels), and the channels may be switched (e.g., dynamically) across the bandwidth. In such cases, if a device (e.g., a base station 105 or a UE 115) re-uses a beamforming codebook across channels, performance may be degraded (e.g., due to beam squinting effects). However, updating the beamforming codebook to account for the corresponding frequencies of a new or different channel may introduce latency or other inefficiencies into the system. That is, changing or modifying a codebook or beam weights used for communication may result in additional processing and latency at a device. Additionally or alternatively, a base station 105 or a UE 115 may be configured (e.g., with a hardware/antenna configuration) to operate optimally at a subset of frequencies within the ultra-wide bandwidth, and may suffer reduced performance when communicating at other frequencies. As such, it may be beneficial for respective devices to operate at some default operating frequency within an ultra-wide bandwidth that enables the device to avoid beam squinting effects as well as delays caused by updating codebooks and/or beam weights for different channels within the ultra-wide bandwidth. Put another way, a device may have one or more device-specific default operating frequencies for communications in an ultra-wide bandwidth, and the communications may be optimized when operating within at least one of the device's default operating frequencies.

A UE 115 or a base station 105 may thus identify one or more default operating frequencies for communicating within the bandwidth and may transmit an indication of the one or more default operating frequencies to one or more other devices (e.g., within a geographical vicinity) in the wireless communications system 100. For instance, the default operating frequencies of the UE 115 or the base station 105 may be provided to other UEs 115, other base stations 105, or other devices (e.g., repeaters, IAB nodes, sidelink nodes, or the like) in wireless communications system 100. The indication may be transmitted via RRC signaling, control signaling, or the like. In some examples, a first wireless device may provide, to a second wireless device, the default operating frequencies of another device. More specifically, a first base station 105 may obtain the default operating frequencies of a UE 115, and the first base station 105 may transmit an indication of the UE's default operating frequencies to a second base station 105. For example, a first base station 105 (or TRP) may handover a UE 115 to a second base station 105 (or TRP). The first base station 105 may identify (e.g., based on an indication received from the UE 115) one or more default operating frequencies of the UE 115 and may communicate this information to the second base station 105. The default operating frequencies may be for communications over respective portions of the bandwidth and may be based on an antenna array configuration of the UE 115. The second base station 105 may configure one or more communications parameters according to the default operating frequencies, and the UE 115 and the second base station 105 may communicate over the ultra-wide bandwidth based on the default operating frequencies and configured communications parameters.

In some examples, the first and second base stations 105 may also exchange respective default operating frequencies with one another. For example, the first base station 105 may indicate one or more of its default operating frequencies to the second base station 105, and vice versa. In some cases, the base stations 105 may exchange the default operating frequency information upon start-up, regularly or semi-persistently, or during the handover procedure for the UE 115.

Figure 2:
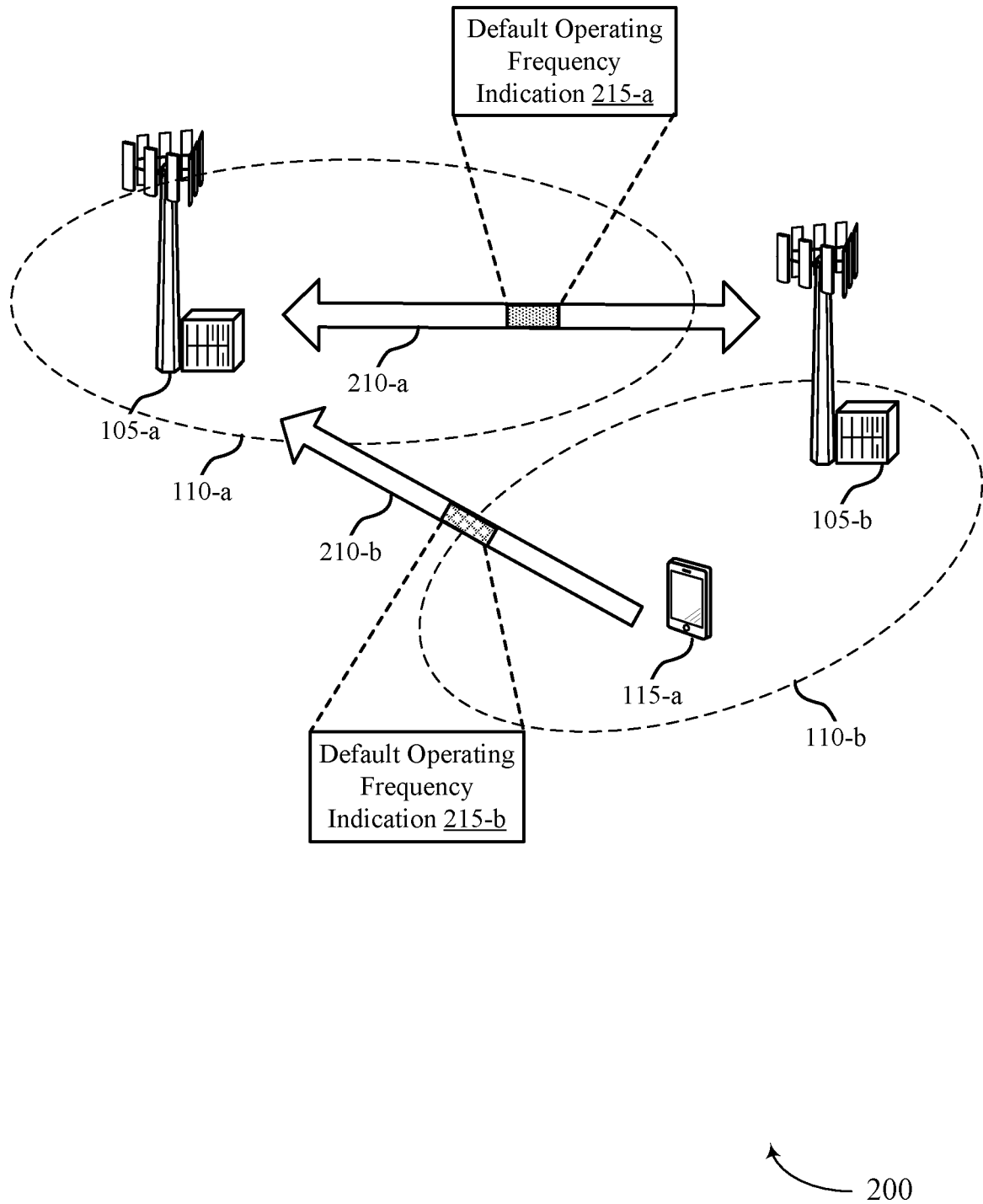
FIG. 2 illustrates an example of a wireless communications system that supports techniques for exchanging ultra-wide bandwidth beamforming information in accordance with aspects of the present disclosure.

FIG. 2 illustrates an example of a wireless communications system 200 that supports techniques for exchanging ultra-wide bandwidth beamforming information in accordance with aspects of the present disclosure. In some examples, the wireless communications system 200 may implement aspects of wireless communications system 100. For example, the wireless communications system 200 includes a UE 115-a, a base station 105-a, and a base station 105-b, which may be examples of a UE 115 and base stations 105, respectively, described with reference to FIG. 1. It is to be understood that references to specific wireless devices (e.g., UEs or base stations) in the below figures are provided for illustrative purposes, and different wireless devices not specifically referred to herein may be used interchangeably with those described herein. Likewise, the described operations performed by a UE 115 may, in some cases, be performed by a base station 105, and vice versa. In some examples, the base station 105-a or the base station 105-b, or both, may be examples of, or include, one or more TRPs. Additionally or alternatively, the base station 105-a or base station 105-b, or both, may be an example of an IAB node, a repeater node (e.g., configured with some retransmission capability), or the like. Further, the UE 115-a may be an example of a CPE, a sidelink node, a repeater node, or the like.

The base station 105-a and the base station 105-b may each provide coverage areas 110-a and 110-b, respectively. The base station 105-a and the base station 105-b may communicate over a communication link 210-a, which may be an example of a backhaul link (e.g., a wired or wireless backhaul link). The base station 105-a may communicate with the UE 115-a over a communication link 210-b. In some examples, the base stations 105 and the UE 115-a may communicate over an ultra-wide bandwidth (e.g., 14 GHz, 25 GHz), where scheduled communications may be transmitted and received within various portions of the ultra-wide bandwidth (e.g., 2 GHz or 3 GHz portions of the ultra-wide bandwidth). Each base station 105 and the UE 115-a may be configured (e.g., with hardware) to perform beamforming with a limited number of RF chains over an antenna array, which may include a fixed inter-antenna element spacing for operation at a default operating frequency. To facilitate more efficient communications between the base stations 105 and the UE 115-a, each device may identify one or more default operating frequencies and may transmit an indication of the default operating frequencies to one or both of the other devices in the wireless communications system 200. Thus, a device in the wireless communications system 200 may consider the default operating frequency information of another device, and may adjust or modify communications parameters to reduce performance loss.

For example, the UE 115-a may identify one or more default operating frequencies and may transmit an indication 215-b to the base station 105-a. Similarly, the base station 105-a and the base station 105-b may each identify one or more respective default operating frequencies and may exchange the corresponding information with one another via default operating frequency indication 215-a. Each frequency of the one or more default operating frequencies of each device may be for communications over respective portions of the bandwidth, and may be associated with an analog beamforming codebook of the respective device. For instance, the default operating frequencies may be associated with one or more carrier frequencies corresponding to the analog beamforming codebook. Additionally or alternatively, the one or more default operating frequencies may be associated with a frequency band from a set of frequency bands or a channel from a set of channels.

Additionally, the one or more default operating frequencies may be associated with an antenna array configuration of the respective device. The antenna array configuration may include an inter-antenna element spacing of an antenna array or antenna panel, which may have uniformly-spaced antenna elements or non-uniformly spaced antenna elements. In the case of non-uniformly spaced antenna elements, the inter-antenna element spacing may be the average inter-antenna element spacing across the array. The inter-antenna element spacing may be in azimuth, in elevation, or both. Each default operating frequency of the one or more default operating frequencies for the device may include a frequency such that approximately half of a wavelength corresponding to the frequency may be equal to a spacing between two or more antenna elements of the antenna array of the respective device. More specifically, a default operating frequency of a device (e.g., UE 115-a, base station 105-a, base station 105-b, etc.) may have some wavelength, $\lambda$, and the spacing of the device's antenna elements (e.g., within an antenna panel of one or more antenna panels) may be approximately equal to $\lambda/2$. Further, the inter-antenna element spacing may have some threshold or tolerance (e.g., $\lambda/2 \pm$ some appropriately chosen small value relative to $\lambda/2$ to account for process variations in printed circuit board design and fabrication) associated with the default operating frequency, such that the inter-antenna element spacing may be different from $\lambda/2$, but may still correspond to the default operating frequency for a particular device. That is, the spacing between two or more antenna elements may be within an upper threshold and a lower threshold, such that the thresholds are associated with substantially half of the wavelength of the frequency. In some cases, the default operating frequency indications 215 may be indicative of the antenna array configuration for the respective device. It is also noted that a default operating frequency may correspond to one or more respective frequencies (or range of frequencies) that may provide for communications performance in accordance with some performance metrics or specifications, where the one or more default operating frequencies may be specific to the device (e.g., based on the device's hardware configuration for communicating over ultra-wide bandwidths). Further, a default operating frequency may, in some cases, be antenna port or RF chain-specific, such that multiple default operating frequencies may be possible at a particular wireless device.

In some cases, identifying the one or more default operating frequencies may include identifying a range of default operating frequencies or one or more frequency boundaries, such as a first (e.g., an upper) frequency boundary and/or a second (e.g., a lower) frequency boundary (e.g., such that the first frequency boundary is different from the second frequency boundary). One or more frequencies within the boundaries may provide beamforming performance that satisfies a threshold, such as a performance threshold (e.g., based on a signal strength threshold for communications over each frequency). In such cases, the default operating frequency indications 215 may include indications of the first frequency boundary, the second frequency boundary, or both. More generally, the default operating frequency indications 215 may provide another device with the operating frequencies that enable efficient communications (e.g., in FR4 or other RF domains). As an example, the UE 115-a may transmit, to the base station 105-a, default operating frequency indication 215-b that includes an indication of an upper frequency boundary (e.g., 65 GHz) and a lower frequency boundary (e.g., 63 GHz). The base station 105-a may thus identify the default operating frequency range of the UE 115-a and communicate with the UE 115-a over one or more frequencies within the range.

The default operating frequency indications 215 may be transmitted via capability signaling (e.g., via RRC signaling). In other examples, the default operating frequencies may be dynamically indicated (e.g., using DCI, SCI, or the like), which may be based on changes in interference measured at a default operating frequency. As an example, communications performance at a first default operating frequency may change (e.g., degrade), and the UE 115-a or the base station 105-a may select a second, different default operating frequency with which to communicate, where the second default operating frequency may be dynamically signaled between the devices.

In some examples, the default operating frequencies may be indicated based on a trigger identified by the device. For example, the base station 105-a may identify a trigger, such as a startup event or an activation or restarting of the base station 105-a, and may transmit a default operating frequency indication 215-a of the base station 105-a to the base station 105-b. The base station 105-b may also transmit a default operating frequency indication 215-a of the base station 105-b to the base station 105-a in a similar manner (e.g., according to a trigger identified at the base station 105-b). Additionally or alternatively, the base stations 105 may exchange default operating frequency information dynamically, regularly (e.g., the trigger may be one or more time periods of a predetermined schedule), or semi-persistently (e.g., the trigger may be one or more time periods of a semi-persistent schedule). In some examples, the base stations 105 may transmit a default operating frequency indication 215-a to one another based on identifying a configuration of a protocol for exchanging default operating frequencies. In any case, exchanging default operating frequency information between base stations 105-a and 105-b may enable the base stations 105 to configure or adjust communications accordingly, which may increase reliability and efficiency in the wireless communications system 200.

In some examples, the base station 105-a may determine to perform a handover procedure to handover the UE 115-a to the base station 105-b. In some cases, the handover may be based on one or more handover conditions being satisfied. Accordingly, the base station 105-a may transmit default operating frequency information of the UE 115-a to the base station 105-b via default operating frequency indication 215-a. The base station 105-a and the base station 105-b may perform the handover such that the UE 115-a may connect to, and resume communications with, the base station 105-b following the handover procedure.

In some examples, the base station 105-a and the base station 105-b may perform a conditional handover of the UE 115-a. For instance, the UE 115-a may have a network configuration for initiating access to a target base station, such as the base station 105-b, based on one or more configured conditions. The conditional handover may be performed based on one or more handover conditions being satisfied. In such examples, the default operating frequency indication 215-a transmitted by the base station 105-a to the base station 105-b may be a conditional handover message. In particular, while communicating with UE 115-a, the base station 105-a may configure one or more handover conditions for the UE 115-a (e.g., via a conditional handover configuration message). In addition, the base station 105-a may transmit a conditional handover request message to the base station 105-b, which may indicate handover information and identify the base station 105-b as a potential target base station (e.g., a target node). The conditional handover request message may include the one or more default operating frequencies of the UE 115-a. The base station 105-b may also confirm the handover request received from the base station 105-a. The UE 115-a may monitor the handover conditions configured by the base station 105-a, and upon the one or more handover conditions being satisfied (e.g., based on measurements, UE mobility, or the like), the UE 115-a may be handed over from the base station 105-a to the base station 105-b.

Based on the handover procedure, the base station 105-b may identify the one or more default operating frequencies of the UE 115-a and may determine which, if any, of the frequencies may provide for efficient communications with the UE 115-a. For example, the base station 105-b may select a frequency band or channel for communication over the bandwidth that is near (e.g., in the frequency domain) or includes a particular default operating frequency of the UE 115-a. In some cases, the base station 105-b may identify one or more default operating frequencies of the base station 105-b. If the base station 105-b has a default operating frequency that is different from the default operating frequency of the UE 115-a, the base station 105-b may choose to communicate in a third default operating frequency (e.g., different from the default operating frequencies of the base station 105-b and the UE 115-a) that satisfies communications performance between the devices. Additionally or alternatively, the default operating frequency indication 215-a may include upper and lower frequency boundaries such that operating frequencies within (e.g., up to and/or including) the boundaries satisfy a predetermined performance threshold (e.g., a predetermined signal strength threshold), and the base station 105-b and UE 115-a may communicate over the bandwidth using one or more frequencies within the frequency boundaries.

The base station 105-b may modify a configuration of one or more communications parameters for the UE 115-a based on the one or more default operating frequencies of the UE 115-a, the base station 105-b, or both. For instance, the base station 105-b may determine, based on the one or more default operating frequencies, that a communications performance threshold may not be satisfied, and may request that the UE 115-a increases a transmission power (e.g., to account for the performance degradation). Other communications parameters may include, but are not limited to, transmission power of the base station 105-b, a modulation and coding scheme (MCS), beamforming parameters of an analog beamforming codebook associated with an antenna array of the UE 115-b, or the like. In any case, the base station 105-b and the UE 115-a may communicate over the ultra-wide bandwidth according to the default operating frequencies.

Figure 3:
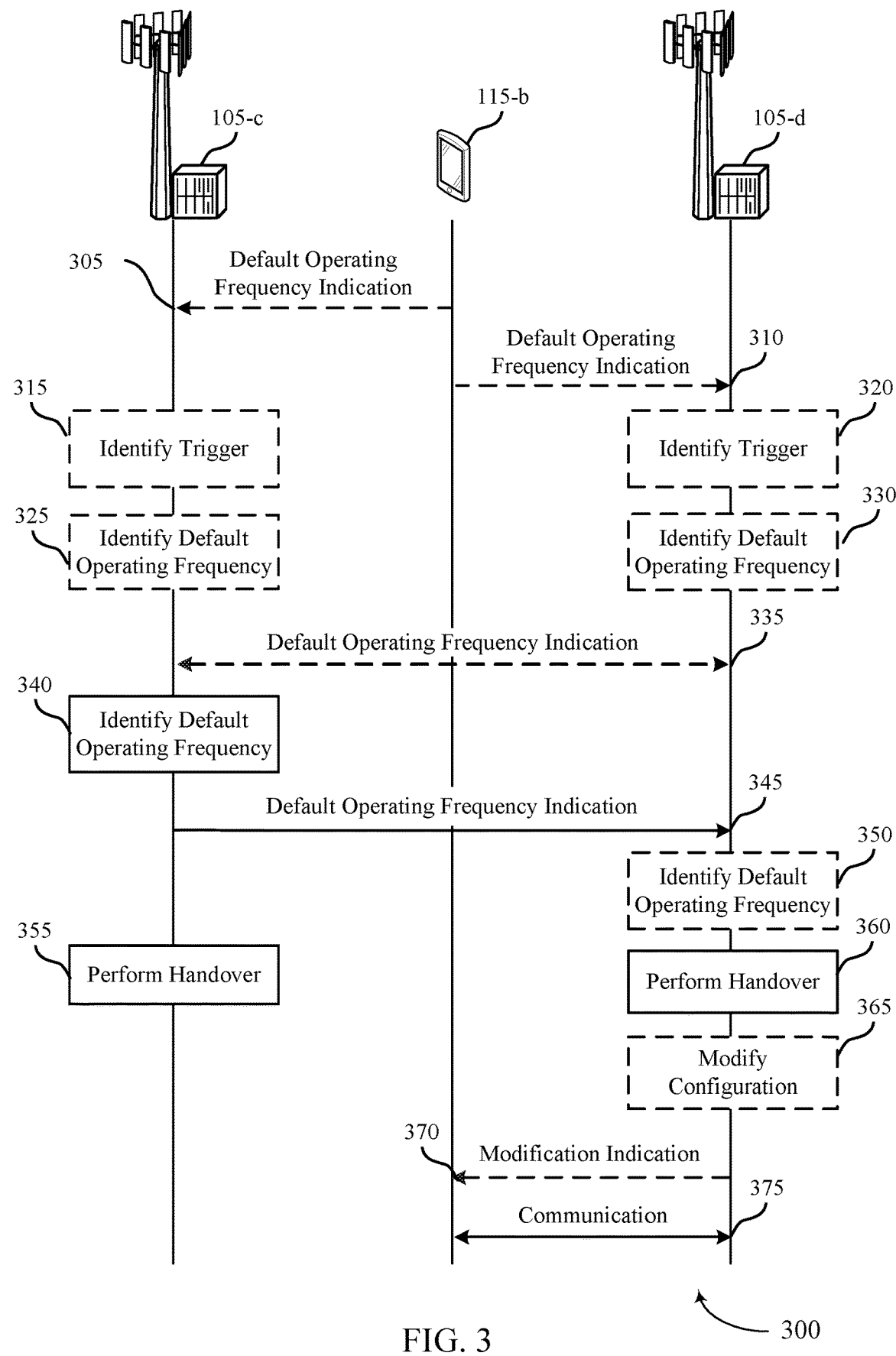
FIG. 3 illustrates an example of a process flow in a system that supports techniques for exchanging ultra-wide bandwidth beamforming information in accordance with aspects of the present disclosure.

FIG. 3 illustrates an example of a process flow 300 in a system that supports techniques for exchanging ultra-wide bandwidth beamforming information in accordance with aspects of the present disclosure. In some examples, the process flow 300 may implement aspects of wireless communications systems 100 and 200. For example, the process flow 300 includes a UE 115-b and base stations 105-c and 105-d that each may be examples of the corresponding devices described with reference to FIGS. 1 and 2. The process flow 300 may illustrate an example of the base stations 105-c and 105-d and the UE 115-b determining and signaling one or more default operating frequencies to be used for communications between the UE 115-b and the base stations 105-c and 105-d.

In the following description of the process flow 300, the operations between the UE 115-b and the base stations 105-c and 105-d may be transmitted in a different order than the order shown, or the operations performed by the base stations 105-c and 105-d and the UE 115-b may be performed in different orders or at different times. Some operations may also be left out of the process flow 300, or other operations may be added to the process flow 300. It is to be understood that while base stations 105-c and 105-d and the UE 115-*b* are shown performing a number of the operations of process flow 300, any wireless device (e.g., a UE, a customer premises equipment, a base station, a TRP, an IAB node, a repeater with different types of capabilities in terms of repetition of signals (also known as "smart" or "dumb" repeaters, or some other terminology), or a sidelink node, among other examples) may perform the operations shown.

At 305, the UE may transmit an indication of one or more default operating frequencies of the UE 115-*b* for communicating over a bandwidth. In some cases, the indication may include a range of default operating frequencies of the UE 115-*b*. The default operating frequencies may be specific to the UE 115-*b*. In some examples, one or more of the default operating frequencies may be predetermined by or associated with an antenna array configuration (e.g., a number of RF chains) of the UE 115-*b* and may indicate an antenna array configuration of UE 115-*b*. The antenna array configuration may include an inter-antenna element spacing of an antenna array having uniformly-spaced antenna elements or non-uniformly spaced antenna elements. Further, the one or more default operating frequencies of the UE 115-*b* may include a frequency such that substantially half of a wavelength corresponding to the frequency is substantially equal to a spacing between two or more antenna elements of an antenna array of the UE 115-*b*. For example, the spacing between two or more antenna elements may be within an upper threshold and a lower threshold that are associated with substantially half of the wavelength of the frequency.

Additionally, or alternatively, the one or more default operating frequencies may be associated with a frequency band of a set of frequency bands, or with one or more carrier frequencies that correspond to an analog beamforming codebook.

At 310, the UE 115-*b* may also transmit the indication of the one or more default operating frequencies of the UE 115-*b* to the base station 105-*d*. In some cases, the indication may include a range of default operating frequencies of the UE 115-*b*.

At 315, the base station 105-*c* may optionally identify a trigger to transmit a message to the base station 105-*d* that includes an indication of one or more default operating frequencies of the base station 105-*c*. The trigger may include, but may not be limited to, a startup event at the base station 105-*c*, activating or restarting the base station 105-*c*, one or more time periods of a predetermined schedule or a semi-persistent schedule, or some combination thereof.

Similarly, at 320, the base station 105-*d* may optionally identify a trigger to transmit a message to the base station 105-*c* that includes an indication of one or more default operating frequencies of the base station 105-*d*. The trigger may include, but may not be limited to, a startup event at the base station 105-*d*, activating or restarting the base station 105-*d*, one or more time periods of a predetermined schedule or a semi-persistent schedule, or some combination thereof.

At 325, the base station 105-*c* may identify one or more operating frequencies of the base station 105-*c*. The one or more default operating frequencies may be associated with an antenna array configuration at the base station 105-*c*, and may be used for communicating over the respective portions of the bandwidth. In some examples, the default operating frequencies may indicate the antenna array configuration of the base station 105-*c*. As an example, the antenna array configuration may include an inter-antenna element spacing in azimuth, in elevation, or both. The antenna array may have antenna elements that are uniformly spaced or non-uniformly spaced. Additionally, or alternatively, the one or more default operating frequencies may be associated with a frequency band of a set of frequency bands, a channel of a set of channels, or one or more carrier frequencies that correspond to an analog beamforming codebook.

In some cases, at 325, the base station 105-*c* may identify a first frequency boundary and a second frequency boundary for each default operating frequency of the one or more default operating frequencies. The first frequency boundary may be different from the second frequency boundary. For example, the first frequency boundary may be an upper frequency boundary and the second frequency boundary may be a lower frequency boundary. One or more frequencies within the upper and lower frequency boundaries may, in some cases, provide beamforming performance that satisfies a performance threshold. For example, the performance threshold may be based on a signal strength threshold (e.g., for communications over each of the one or more frequencies).

At 330, the base station 105-*d* may identify one or more operating frequencies of the base station 105-*d*. The one or more default operating frequencies may be associated with an antenna array configuration at the base station 105-*d*, and may be used for communicating over the respective portions of the bandwidth. In some examples, the default operating frequencies may indicate the antenna array configuration of the base station 105-*d*. As an example, the antenna array configuration may include an inter-antenna element spacing in azimuth, in elevation, or both. The antenna array may have antenna elements that are uniformly spaced or non-uniformly spaced. Additionally, or alternatively, the one or more default operating frequencies may be associated with a frequency band of a set of frequency bands, a channel of a set of channels, or one or more carrier frequencies that correspond to an analog beamforming codebook.

In some cases, at 330, the base station 105-*d* may identify a first frequency boundary and a second frequency boundary for each default operating frequency of the one or more default operating frequencies. The first frequency boundary may be different from the second frequency boundary. For example, the first frequency boundary may be an upper frequency boundary and the second frequency boundary may be a lower frequency boundary. One or more frequencies within the upper and lower frequency boundaries may, in some cases, provide beamforming performance that satisfies a performance threshold. For example, the performance threshold may be based on a signal strength threshold (e.g., for communications over each of the one or more frequencies).

At 335, the base station 105-*c* may transmit an indication of the one or more default operating frequencies of the base station 105-*c* to the base station 105-*d*. If, at 325, the base station 105-*c* identified a first frequency boundary and a second frequency boundary, the indication transmitted at 335 may include an indication of the first frequency boundary, the second frequency boundary, or both. In some cases, the base station 105-*c* may transmit the indication at 335 if the trigger identified at 315 is satisfied.

Similarly, at 335, the base station 105-*d* may transmit an indication of the one or more default operating frequencies of the base station 105-*d* to the base station 105-*c*. If, at 330, the base station 105-*c* identified a first frequency boundary and a second frequency boundary, the indication transmitted at 335 may include an indication of the first frequency boundary, the second frequency boundary, or both. In some examples, the base station 105-*d* may transmit the indication if the trigger identified at 320 is satisfied.

In some examples, the indication transmitted at 335 by the base station 105-*c* or the base station 105-*d* may correspond to a configuration of a protocol for exchanging default operating frequencies. For example, the base station 105-c may identify a configuration of a protocol for exchanging default operating frequencies with another base station (e.g., base station 105-d), and may transmit the indication according to the protocol.

At 340, the base station 105-c may identify one or more default operating frequencies of the UE 115-b. The one or more default operating frequencies may be for communications over respective portions of a bandwidth and may be associated with an antenna array configuration of the UE 115-b. In some examples, the base station 105-c may identify the default operating frequencies of the UE 115-b based on the indication received at 305. In some cases, at 340, the base station 105-c may also identify one or more default operating frequencies of the base station 105-d, for example based on the indication received from the base station 105-d at 335.

At 345, the base station 105-c may transmit, to the base station 105-d, an indication of the one or more default operating frequencies of the UE 115-b, for example, based on the identifying at 340.

At 350, the base station 105-d may identify one or more default operating frequencies of the UE 115-b, the base station 105-c, or both. In some cases, the base station 105-d may identify the default operating frequencies of the UE 115-b based on the indication received from the UE 115-b at 310 or the indication received from the base station 105-c at 345. Similarly, the base station 105-d may identify the default operating frequencies of the base station 105-c based on the indication received at 335.

At 355, the base station 105-c may perform a handover of the UE 115-b from the base station 105-c to the base station 105-d. The handover may be performed based on one or more handover conditions being satisfied. In some examples, the handover may be a conditional handover.

At 360, the base station 105-d may perform a handover of the UE 115-b from the base station 105-c to the base station 105-d. The handover may be performed based on one or more handover conditions being satisfied. In some examples, the handover may be a conditional handover. In some cases, the indication transmitted at 345 may be based on performing the handover or the conditional handover.

At 365, the base station 105-d may optionally modify a configuration of one or more communications parameters for the UE 115-b. The modifying may be performed based on the one or more default operating parameters of the UE 115-b. The communications parameters may include, but are not limited to, an MCS, a transmission power, or a combination thereof, among other examples.

At 370, the base station 105-d may transmit an indication of the configuration modified at 365 to the UE 115-b. For example, the base station 105-d may transmit an indication of the modified configuration to the UE 115-b.

At 375, the base station 105-d and the UE 115-b may communicate over the bandwidth based on the one or more default operating frequencies of the UE 115-b.

Figure 4:
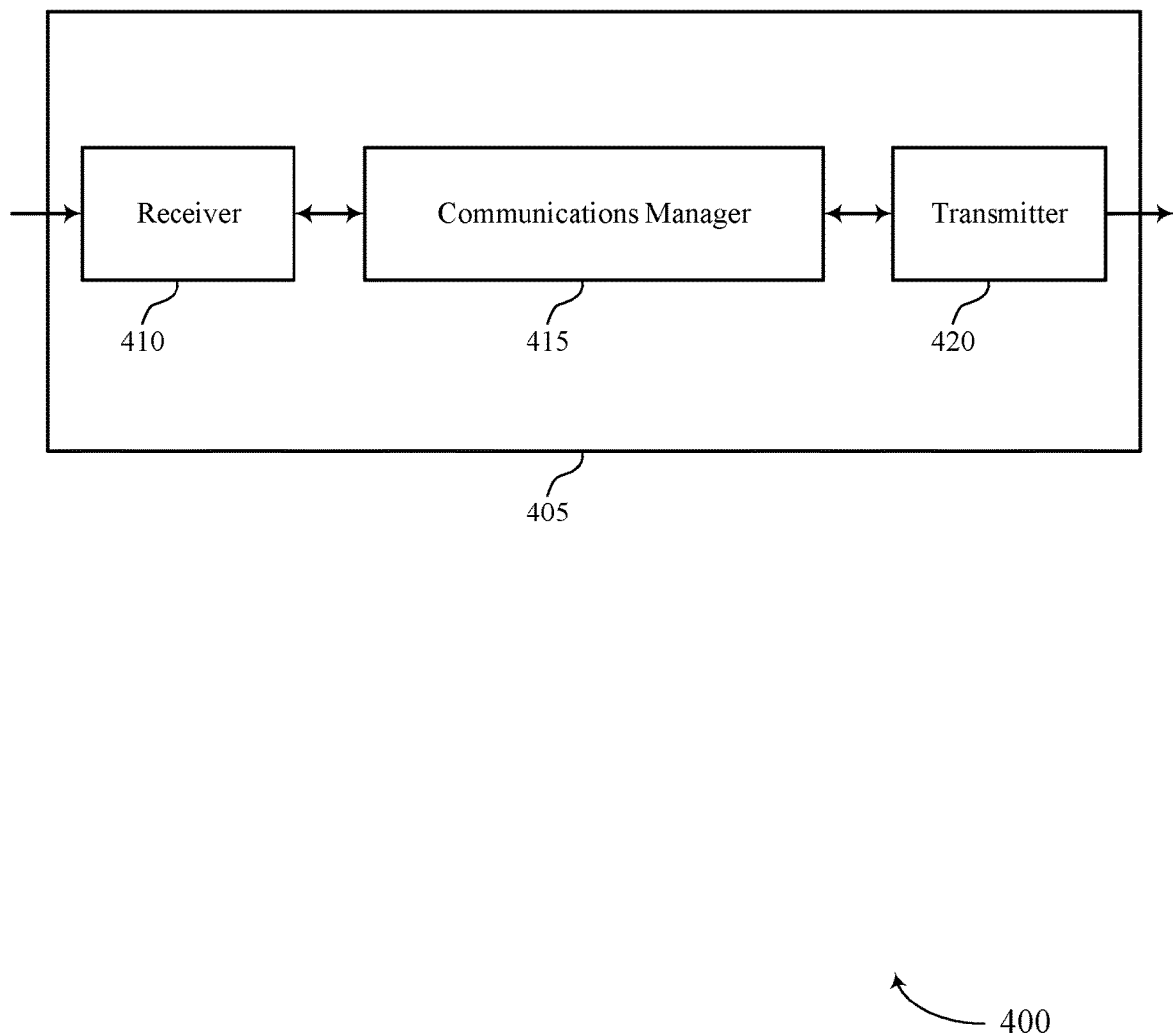
FIGS. 4 and 5 show block diagrams of devices that support techniques for exchanging ultra-wide bandwidth beamforming information in accordance with aspects of the present disclosure.

FIG. 4 shows a block diagram 400 of a device 405 that supports techniques for exchanging ultra-wide bandwidth beamforming information in accordance with aspects of the present disclosure. The device 405 may be an example of aspects of a base station 105 as described herein. The device 405 may include a receiver 410, a communications manager 415, and a transmitter 420. The device 405 may also include one or more processors, memory coupled with the one or more processors, and instructions stored in memory that are executable by the one or more processors to enable the one or more processors to perform the default operating frequency exchange features discussed herein. Each of these components may be in communication with one another (e.g., via one or more buses).

The receiver 410 may receive information such as packets, user data, or control information associated with various information channels (e.g., control channels, data channels, and information related to techniques for exchanging ultra-wide bandwidth beamforming information, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may identify, by the first wireless device, one or more default operating frequencies of a second wireless device, the one or more default operating frequencies for communications over respective portions of a bandwidth and associated with an antenna array configuration of the second wireless device, transmit, to a third wireless device, a message including an indication of the one or more default operating frequencies of the second wireless device, and perform a handover of the second wireless device from the first wireless device to the third wireless device based on one or more handover conditions being satisfied, where the message including the indication of the one or more default operating frequencies is transmitted to the third wireless device based on performing the handover.

The communications manager 415 may also receive, from a second wireless device, a message including an indication of one or more default operating frequencies of a third wireless device, the one or more default operating frequencies for communications over respective portions of a bandwidth and associated with an antenna array configuration of the third wireless device, perform a handover of the third wireless device from the second wireless device to the first wireless device based on one or more handover conditions being satisfied, where receiving the message including the indication of the one or more default operating frequencies of the third wireless device is based on performing the handover, and communicate with the third wireless device over the bandwidth based on the one or more default operating frequencies of the third wireless device. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

By including or configuring the communications manager 415 in accordance with examples as described herein, the device 505 (e.g., a processor controlling or otherwise coupled to the receiver 410, the transmitter 420, the communications manager 415, or a combination thereof) may support techniques for communicating with other wireless devices in ultra-wide bandwidth systems based on default operating frequencies. For instance, the device 405 may be an example of a target TRP that performs a handover procedure with a UE. Based on exchanging default operating frequency information of the UE with a source TRP, the device 405 may adjust one or more communications parameters to avoid beamforming or other loss in subsequent communications with the UE and increase communications reliability and robustness. Increased reliability and robustness may further increase the likelihood that communications between the device 405 and the UE are successfully received and decoded, which may decrease a number of potential retransmissions. Accordingly, the device 405 may power off one or more processing units associated with transmitting or decoding monitoring occasions, which may reduce processing and power consumption at the device 405.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
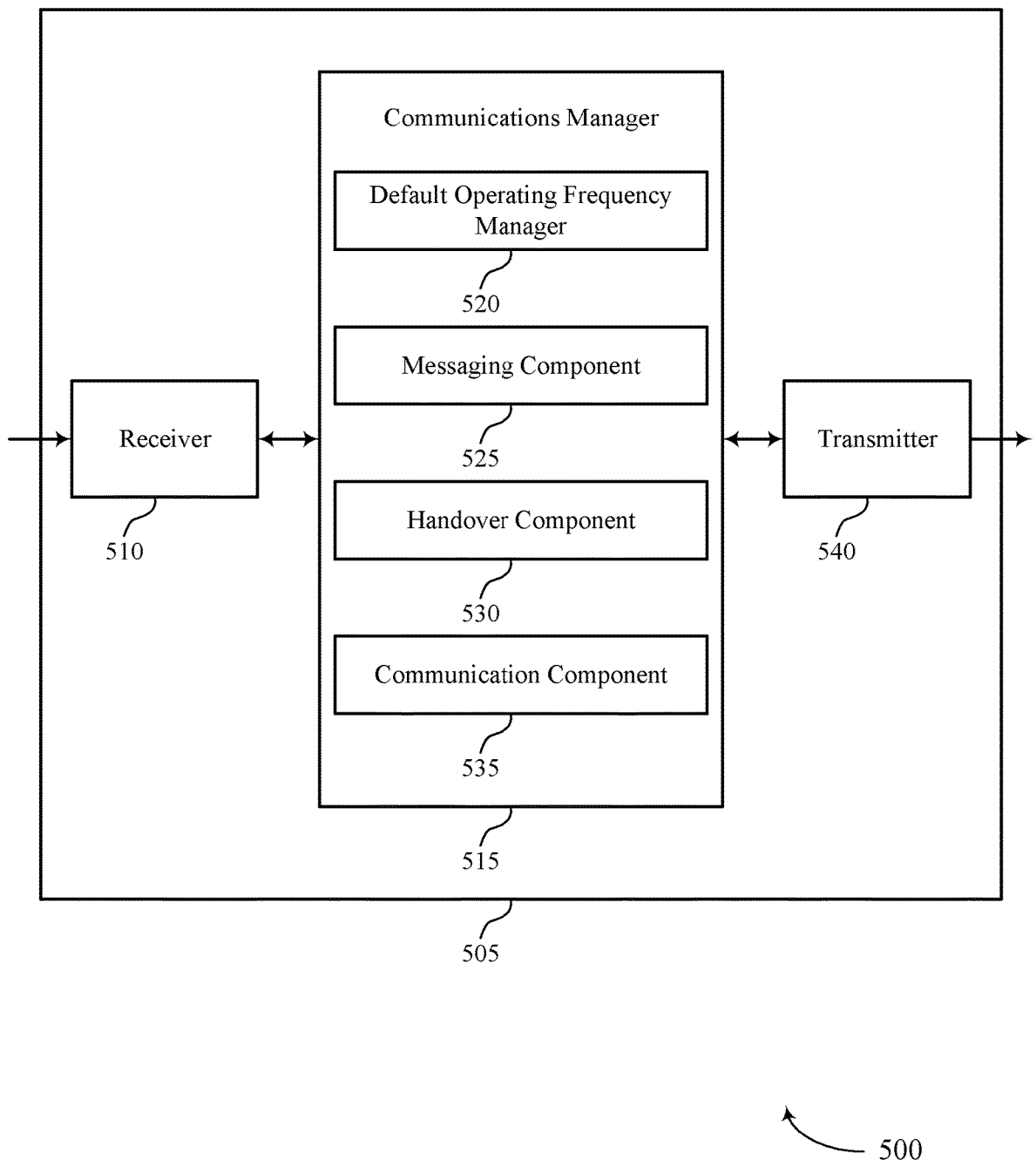

FIG. 5 shows a block diagram 500 of a device 505 that supports techniques for exchanging ultra-wide bandwidth beamforming information in accordance with aspects of the present disclosure. The device 505 may be an example of aspects of a device 405, or a base station 105 as described herein. In some examples, the device 505 may be an example of or include the components of an IAB node, a TRP, a UE 115, a repeater, a sidelink node, or the like. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to techniques for exchanging ultra-wide bandwidth beamforming information, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a default operating frequency manager 520, a messaging component 525, a handover component 530, and a communication component 535. The communications manager 515 may be an example of aspects of the communications manager 710 described herein.

The default operating frequency manager 520 may identify (e.g., a first wireless device) one or more default operating frequencies of a second wireless device. The one or more default operating frequencies may be used for communications over respective portions of a bandwidth (e.g., an ultra-wide bandwidth) and associated with an antenna array configuration of the second wireless device. That is, each of the one or more default operating frequencies may be specific to a device based on the device's antenna array configuration, including an inter-element spacing between elements of an antenna array.

The messaging component 525 may transmit, to a third wireless device, a message including an indication of the one or more default operating frequencies of the second wireless device. In other examples, the messaging component 525 may receive, from a second wireless device, a message including an indication of one or more default operating frequencies of a third wireless device, the one or more default operating frequencies for communications over respective portions of a bandwidth and associated with an antenna array configuration of the third wireless device.

The handover component 530 may perform a handover of the second wireless device from the first wireless device to the third wireless device based on one or more handover conditions being satisfied, where the message including the indication of the one or more default operating frequencies is transmitted to the third wireless device based on performing the handover. Additionally or alternatively, the handover component 530 may perform a handover of the third wireless device from the second wireless device to the first wireless device based on one or more handover conditions being satisfied, where receiving the message including the indication of the one or more default operating frequencies of the third wireless device is based on performing the handover.

The communication component 535 may communicate with the third wireless device over the bandwidth based on the one or more default operating frequencies of the third wireless device.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

In some cases, the default operating frequency manager 520, the messaging component 525, the handover component 530, and the communication component 535 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the default operating frequency manager 520, the messaging component 525, the handover component 530, and the communication component 535 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 6:
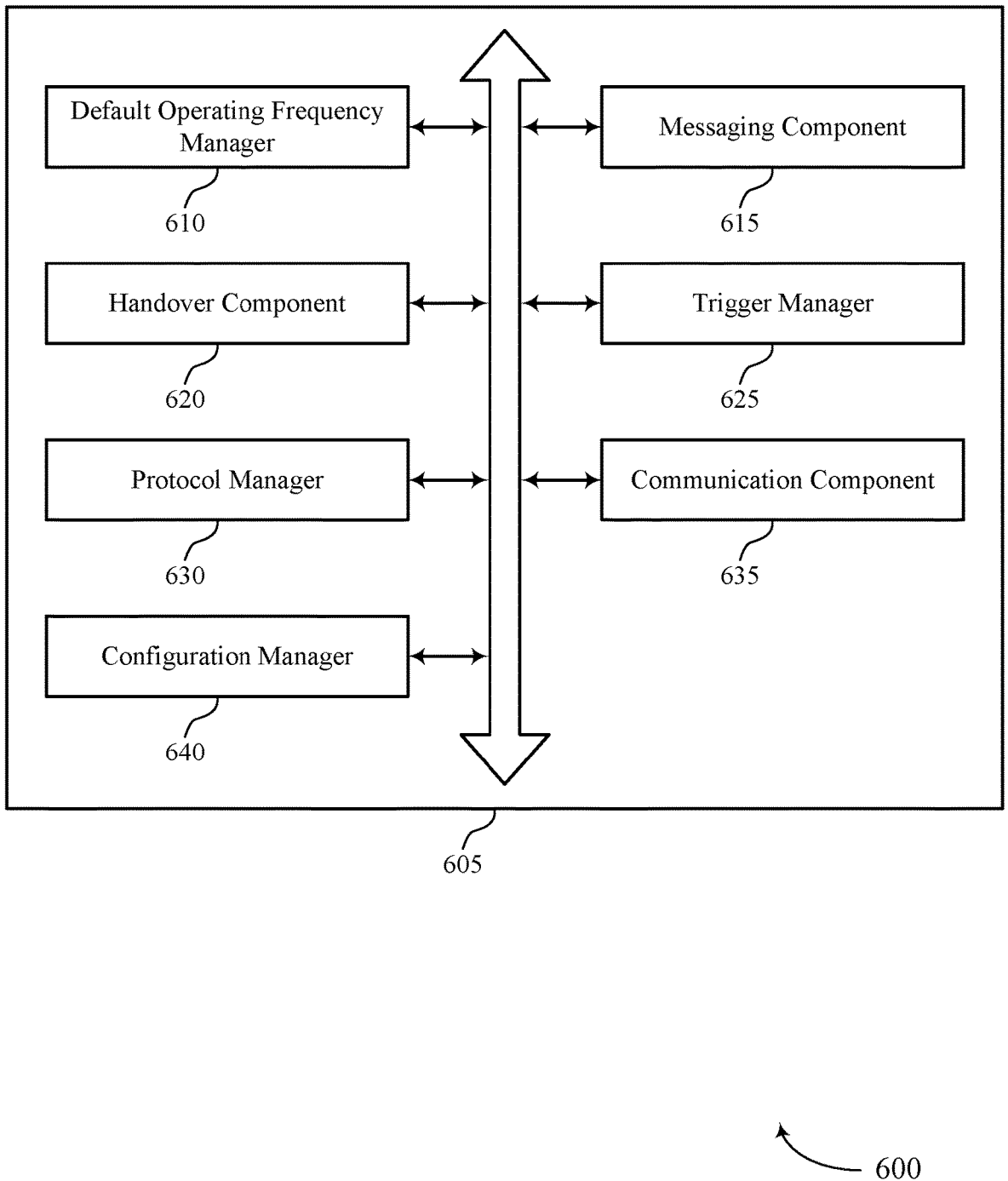
FIG. 6 shows a block diagram of a communications manager that supports techniques for exchanging ultra-wide bandwidth beamforming information in accordance with aspects of the present disclosure.

FIG. 6 shows a block diagram 600 of a communications manager 605 that supports techniques for exchanging ultra-wide bandwidth beamforming information in accordance with aspects of the present disclosure. The communications manager 605 may be an example of aspects of a communications manager 415, a communications manager 515, or a communications manager 710 described herein. The communications manager 605 may include a default operating frequency manager 610, a messaging component 615, a handover component 620, a trigger manager 625, a protocol manager 630, a communication component 635, and a configuration manager 640. Each of these modules may communicate, directly or indirectly, with one another (e.g., via one or more buses).

The default operating frequency manager 610 may identify (e.g., by a first wireless device) one or more default operating frequencies of a second wireless device. In such examples, the one or more default operating frequencies may be used for communications over respective portions of a bandwidth (e.g., an ultra-wide bandwidth) and associated with an antenna array configuration of the second wireless device.

In some examples, the default operating frequency manager 610 may identify one or more default operating frequencies of the first wireless device, the one or more default operating frequencies of the first wireless device used for communicating over the respective portions of the (ultra-wide) bandwidth and associated with an antenna array configuration of the first wireless device. In some cases, the one or more default operating frequencies of the first wireless device may indicate the antenna array configuration of the first wireless device. Here, the antenna array configuration may include an inter-antenna element spacing of an antenna array having uniformly-spaced antenna elements or non-uniformly-spaced antenna elements. In some cases, the inter-antenna element spacing of the antenna array is in azimuth, or in elevation, or vertically, or horizontally, or in other directions or orientations, or any combination thereof.

In some examples, the default operating frequency manager 610 may identify a first frequency boundary and a second frequency boundary for each default operating frequency of the one or more default operating frequencies of the first wireless device, where the first frequency boundary is different from the second frequency boundary. In some cases, the first frequency boundary includes an upper frequency boundary and the second frequency boundary includes a lower frequency boundary. That is, the frequency boundaries may represent a range of default operating frequencies for the corresponding device. In some cases, the one or more frequencies within the upper frequency boundary and the lower frequency boundary may provide beamforming performance that satisfies a performance threshold that may be based on a signal strength threshold for communications over each of the one or more frequencies. Put another way, the default operating frequencies within the range may enable efficient beamforming between two wireless devices.

In some cases, each default operating frequency of the one or more default operating frequencies includes a frequency such that substantially half of a wavelength corresponding to the frequency is substantially equal to a spacing between two or more antenna elements of an antenna array of the second wireless device. For example, as described herein, half of a wavelength of a default operating frequency for a wireless device may be approximately equal to the inter-element spacing of antenna elements for that wireless device. In addition, the spacing between two or more antenna elements of the antenna array of the wireless device may be within an upper threshold and a lower threshold that are associated with substantially half of the wavelength of the frequency. In such cases, half the default operating frequency of a device may generally correspond to the inter-element spacing of the device's antenna array elements within some tolerance or threshold. The antenna elements may be spaced either more or less than a distance that is approximately equal to half of the wavelength of a default operating frequency (e.g., the antenna elements may be separated by $\lambda/2 \pm$ some value or distance).

In some examples, the default operating frequency manager 610 may identify the one or more default operating frequencies of a second wireless device based on receiving a message, where the one or more default operating frequencies of the second wireless device are associated with an antenna array configuration of the second wireless device, or one or more carrier frequencies associated with an analog beamforming codebook of the second wireless device, or a frequency band from a set of frequency bands, or a channel from a set of channels, or any combination thereof.

In some examples, the default operating frequency manager 610 may further identify one or more default operating frequencies of the third wireless device based on receiving a message. The one or more default operating frequencies of the third wireless device may be associated with an antenna array configuration of the third wireless device, or one or more carrier frequencies associated with an analog beamforming codebook of the third wireless device, or a frequency band from a set of frequency bands, or a channel from a set of channels, or any combination thereof. In some examples, the default operating frequency manager 610 may identify the one or more default operating frequencies of the third wireless device based on receiving a message.

In some cases, the first wireless device, second wireless device, or the third wireless device may be a base station, an IAB node, or a TRP. In some cases, the first wireless device, the second wireless device, or the third wireless device may be a UE, or a CPE, or a sidelink node, or a wireless repeater configured for certain retransmissions.

The messaging component 615 may transmit, to a third wireless device, a message including an indication of the one or more default operating frequencies of the second wireless device. In some examples, the messaging component 615 may receive, from a second wireless device, a message including an indication of one or more default operating frequencies of a third wireless device, the one or more default operating frequencies for communications over respective portions of a bandwidth and associated with an antenna array configuration of the third wireless device. In some cases, the message may be a conditional handover message that includes an indication of the one or more default operating frequencies of another device (e.g., a device being handed over).

In some examples, the messaging component 615 may transmit, to the third wireless device, a second message including an indication of the one or more default operating frequencies of the first wireless device. In some examples, the messaging component 615 may receive, from the second wireless device, a second message indicating the one or more default operating frequencies of the second wireless device, where identifying the one or more default operating frequencies of the second wireless device is based on receiving the second message.

In some examples, the messaging component 615 may receive, from the third wireless device, a third message including an indication of one or more default operating frequencies of the third wireless device. In some examples, the messaging component 615 may transmit, to the second wireless device, a second message indicating the one or more default operating frequencies of the first wireless device. In some examples, the indication of the one or more default operating frequencies of the first wireless device may include an indication of at least the first frequency boundary, or the second frequency boundary, or both.

In some examples, the messaging component 615 may receive, from the third wireless device, a second message including an indication of the one or more default operating frequencies of the third wireless device. In some examples, the messaging component 615 may receive, from the second wireless device, a third message including an indication of one or more default operating frequencies of the second wireless device. In some cases, the messages may include an indication of a range of default operating frequencies of the second wireless device.

The handover component 620 may perform a handover of the second wireless device from the first wireless device to the third wireless device based on one or more handover conditions being satisfied, where the message including the indication of the one or more default operating frequencies is transmitted to the third wireless device based on performing the handover. In other examples, the handover component 620 may perform a handover of the third wireless device from the second wireless device to the first wireless device based on one or more handover conditions being satisfied, where receiving the message including the indication of the one or more default operating frequencies of the third wireless device is based on performing the handover.

In some examples, performing the handover may include performing a conditional handover of the second wireless device from the first wireless device to the third wireless device, the conditional handover being based on the one or more handover conditions being satisfied. Similarly, in some examples, performing the handover may include performing a conditional handover of the third wireless device from the second wireless device to the first wireless device, where the conditional handover may be based on the one or more handover conditions being satisfied.

The communication component 635 may communicate with the third wireless device over the bandwidth based on the one or more default operating frequencies of the third wireless device.

The trigger manager 625 may identify a trigger for transmitting the message including the indication of the one or more default operating frequencies of the first wireless device, where transmitting the second message is based on the trigger being satisfied. In some cases, the trigger includes a startup event at the wireless device, activating the wireless device, restarting the wireless device, one or more time periods of a predetermined schedule, one or more time periods of a semi-persistent schedule, or any combination thereof.

The protocol manager 630 may identify a configuration of a protocol for exchanging default operating frequencies with the wireless device, where transmitting the message including the one or more default operating frequencies is based on the protocol.

The configuration manager 640 may modify a configuration of one or more communications parameters for the third wireless device based on the one or more default operating frequencies of the third wireless device. In some examples, the one or more communications parameters may include an MCS, or a transmission power, or any combination thereof. In some examples, the configuration manager 640 may transmit, to another wireless device (e.g., a UE), an indication of the modified configuration.

In some cases, the default operating frequency manager 610, the messaging component 615, the handover component 620, the trigger manager 625, the protocol manager 630, the communication component 635, and the configuration manager 640 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the default operating frequency manager 610, the messaging component 615, the handover component 620, the trigger manager 625, the protocol manager 630, the communication component 635, and the configuration manager 640 discussed herein.

Figure 7:
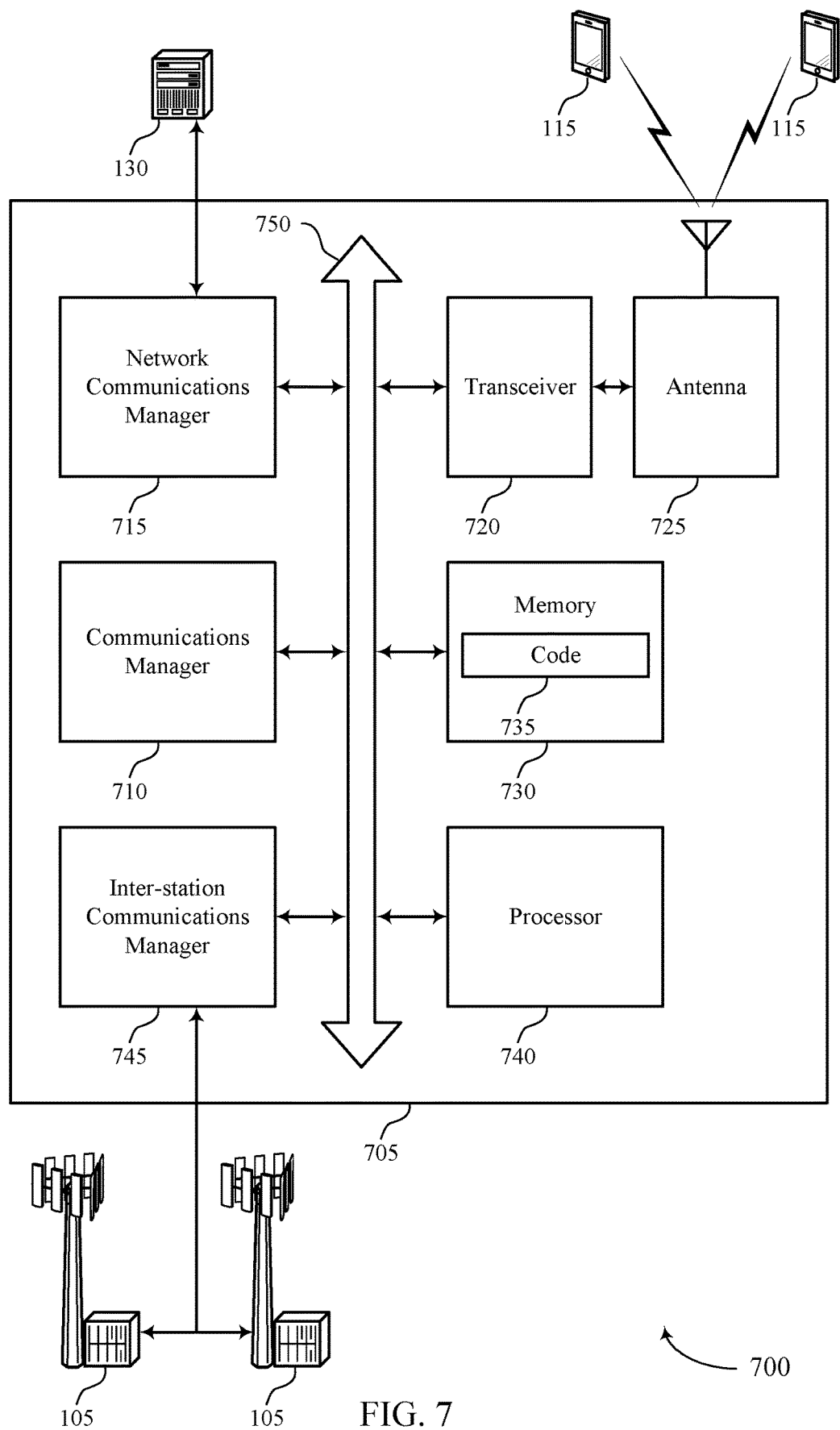
FIG. 7 shows a diagram of a system including a device that supports techniques for exchanging ultra-wide bandwidth beamforming information in accordance with aspects of the present disclosure.

FIG. 7 shows a diagram of a system 700 including a device 705 that supports techniques for exchanging ultra-wide bandwidth beamforming information in accordance with aspects of the present disclosure. The device 705 may be an example of or include the components of device 405, device 505, or a base station 105 as described herein. In some examples, the device 705 may be an example of or include the components of an IAB node, a TRP, a UE 115, a repeater, a sidelink node, or the like. The device 705 may include components for bi-directional voice and data communications including components for transmitting and receiving communications, including a communications manager 710, a network communications manager 715, a transceiver 720, an antenna 725, memory 730, a processor 740, and an inter-station communications manager 745. These components may be in electronic communication via one or more buses (e.g., bus 750).

The communications manager 710 may identify, by the first wireless device, one or more default operating frequencies of a second wireless device, the one or more default operating frequencies for communications over respective portions of a bandwidth and associated with an antenna array configuration of the second wireless device, transmit, to a third wireless device, a message including an indication of the one or more default operating frequencies of the second wireless device, and perform a handover of the second wireless device from the first wireless device to the third wireless device based on one or more handover conditions being satisfied, where the message including the indication of the one or more default operating frequencies is transmitted to the third wireless device based on performing the handover.

The communications manager 710 may also receive, from a second wireless device, a message including an indication of one or more default operating frequencies of a third wireless device, the one or more default operating frequencies for communications over respective portions of a bandwidth and associated with an antenna array configuration of the third wireless device, perform a handover of the third wireless device from the second wireless device to the first wireless device based on one or more handover conditions being satisfied, where receiving the message including the indication of the one or more default operating frequencies of the third wireless device is based on performing the handover, and communicate with the third wireless device over the bandwidth based on the one or more default operating frequencies of the third wireless device.

The network communications manager 715 may manage communications with the core network (e.g., via one or more wired backhaul links). For example, the network communications manager 715 may manage the transfer of data communications for client devices, such as one or more UEs 115.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases the device may have more than one antenna 725, which may be capable of concurrently transmitting or receiving multiple wireless transmissions. In some examples, the device 705 may include one or more antenna arrays or antenna panels, where each antenna panel may include two or more antenna elements used for wireless communications.

The memory 730 may include RAM, ROM, or a combination thereof. The memory 730 may store computer-readable code 735 including instructions that, when executed by a processor (e.g., the processor 740) cause the device to perform various functions described herein. In some cases, the memory 730 may contain, among other things, a basic input/output system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some cases, a memory controller may be integrated into processor 740. The processor 740 may be configured to execute computer-readable instructions stored in a memory (e.g., the memory 730) to cause the device 705 to perform various functions (e.g., functions or tasks supporting techniques for exchanging ultra-wide bandwidth beamforming information).

The inter-station communications manager 745 may manage communications with other base station 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communication network technology to provide communication between base stations 105.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

By including or configuring the communications manager 710 in accordance with examples as described herein, the device 705 may support techniques for communicating with other wireless devices in ultra-wide bandwidth systems based on default operating frequencies. Communications between the device 705 and other devices with similar default operating frequencies may be associated with reduced beamforming loss, and may be more likely to be successfully received and decoded. Accordingly, the device 705 may adjust one or more communications parameters, for example, as part of a handover procedure with another device and based on default operating frequency information associated with the other device. Subsequent communications with the other device may be more reliable and may therefore enable the device 705 to avoid possible retransmissions, thereby experiencing improved throughput and efficiency in the system.

Figure 8:
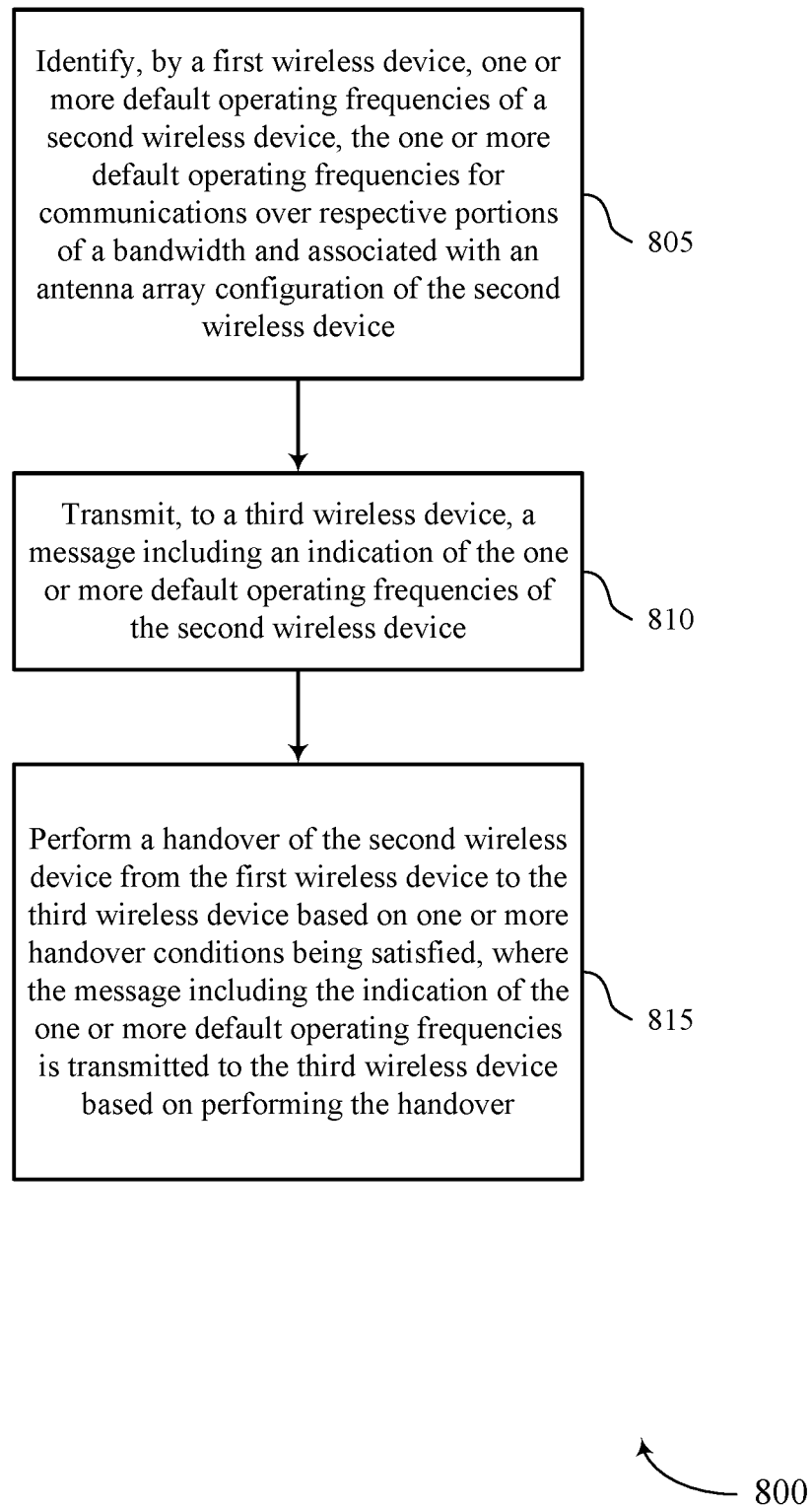
FIGS. 8 through 12 show flowcharts illustrating methods that support techniques for exchanging ultra-wide bandwidth beamforming information in accordance with aspects of the present disclosure.

FIG. 8 shows a flowchart illustrating a method 800 that supports techniques for exchanging ultra-wide bandwidth beamforming information in accordance with aspects of the present disclosure. The operations of method 800 may be implemented by a wireless device (e.g., a first wireless device) or its components as described herein. For example, the operations of method 800 may be performed by a communications manager as described with reference to FIGS. 4 through 7. In some examples, a wireless device may execute a set of instructions to control the functional elements of the wireless device to perform the functions described herein. Additionally or alternatively, a wireless device may perform aspects of the functions described herein using special-purpose hardware. In some cases, the wireless device may be an example of a base station 105, an IAB node, a TRP, or another network device. In other examples, the wireless device may be an example of a UE 115, a sidelink node, a repeater, or other device.

At 805, the first wireless device may identify, by the first wireless device, one or more default operating frequencies of a second wireless device, the one or more default operating frequencies for communications over respective portions of a bandwidth and associated with an antenna array configuration of the second wireless device. The operations of 805 may be performed according to the methods described herein. In some examples, aspects of the operations of 805 may be performed by a default operating frequency manager as described with reference to FIGS. 4 through 7.

At 810, the first wireless device may transmit, to a third wireless device, a message including an indication of the one or more default operating frequencies of the second wireless device. The operations of 810 may be performed according to the methods described herein. In some examples, aspects of the operations of 810 may be performed by a messaging component as described with reference to FIGS. 4 through 7.

At 815, the first wireless device may perform a handover of the second wireless device from the first wireless device to the third wireless device based on one or more handover conditions being satisfied, where the message including the indication of the one or more default operating frequencies is transmitted to the third wireless device based on performing the handover. The operations of 815 may be performed according to the methods described herein. In some examples, aspects of the operations of 815 may be performed by a handover component as described with reference to FIGS. 4 through 7.

Figure 9:
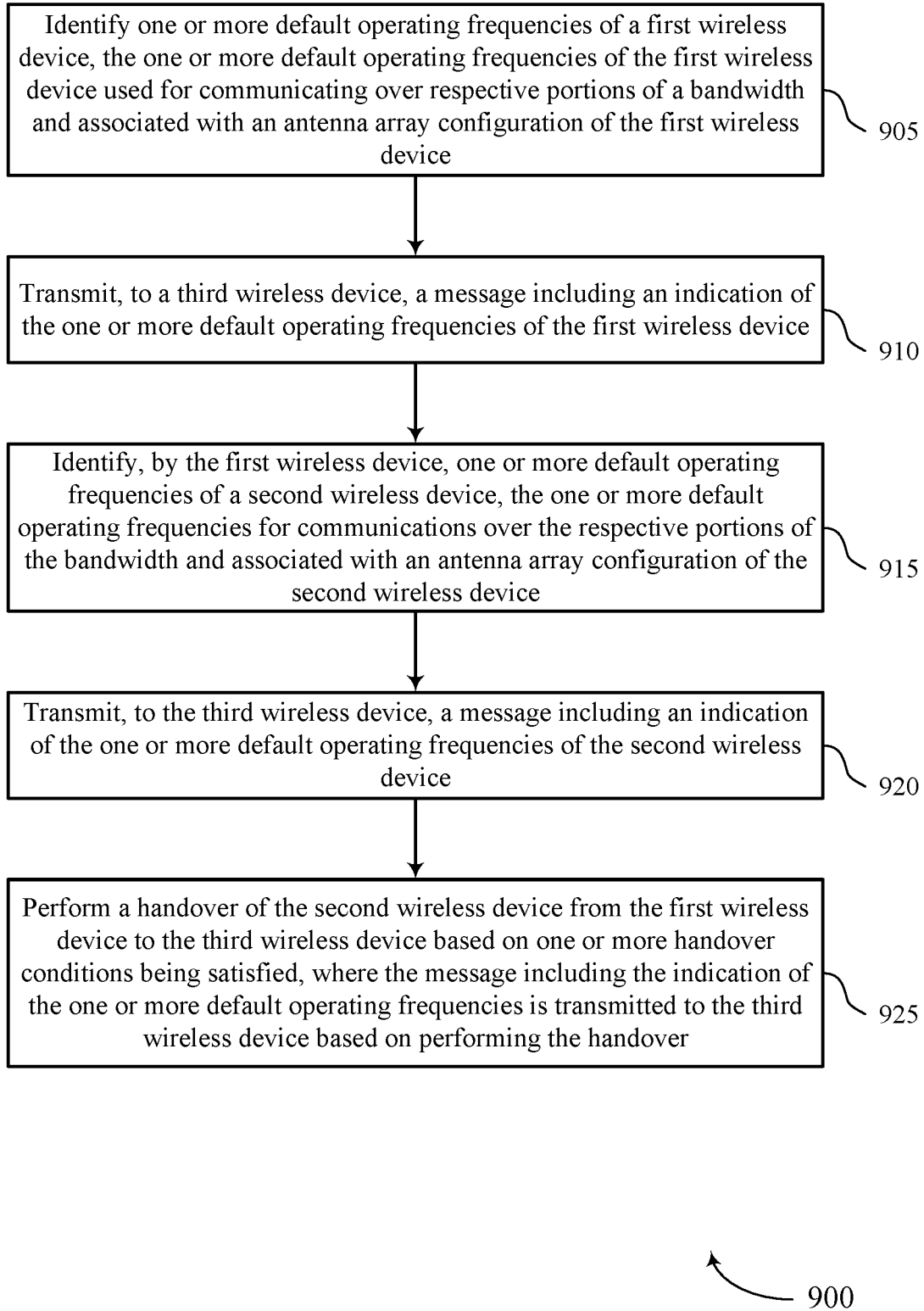

FIG. 9 shows a flowchart illustrating a method 900 that supports techniques for exchanging ultra-wide bandwidth beamforming information in accordance with aspects of the present disclosure. The operations of method 900 may be implemented by a wireless device (e.g., a first wireless device) or its components as described herein. For example, the operations of method 900 may be performed by a communications manager as described with reference to FIGS. 4 through 7. In some examples, a wireless device may execute a set of instructions to control the functional elements of the wireless device to perform the functions described herein. Additionally or alternatively, a wireless device may perform aspects of the functions described herein using special-purpose hardware. In some cases, the wireless device may be an example of a base station 105, an IAB node, a TRP, or another network device. In other examples, the wireless device may be an example of a UE 115, a sidelink node, a repeater, or other device.

At 905, the first wireless device may identify one or more default operating frequencies of the first wireless device, the one or more default operating frequencies of the first wireless device used for communicating over respective portions of a bandwidth (e.g., an ultra-wide bandwidth) and associated with an antenna array configuration of the first wireless device. The operations of 905 may be performed according to the methods described herein. In some examples, aspects of the operations of 905 may be performed by a default operating frequency manager as described with reference to FIGS. 4 through 7.

At 910, the first wireless device may transmit, to a third wireless device, a message (e.g., a second message) including an indication of the one or more default operating frequencies of the first wireless device. In such cases, the first wireless device and the third wireless device may exchange default operating frequencies with each other. The operations of 910 may be performed according to the methods described herein. In some examples, aspects of the operations of 910 may be performed by a messaging component as described with reference to FIGS. 4 through 7.

At 915, the first wireless device may identify one or more default operating frequencies of a second wireless device (e.g., a UE). In some examples, the one or more default operating frequencies may be used for communications over the respective portions of the bandwidth and associated with an antenna array configuration of the second wireless device. The operations of 915 may be performed according to the methods described herein. In some examples, aspects of the operations of 915 may be performed by a default operating frequency manager as described with reference to FIGS. 4 through 7.

At 920, the first wireless device may transmit, to the third wireless device, a message including an indication of the one or more default operating frequencies of the second wireless device. The operations of 920 may be performed according to the methods described herein. In some examples, aspects of the operations of 920 may be performed by a messaging component as described with reference to FIGS. 4 through 7.

At 925, the first wireless device may perform a handover of the second wireless device from the first wireless device to the third wireless device based on one or more handover conditions being satisfied, where the message including the indication of the one or more default operating frequencies is transmitted to the third wireless device based on performing the handover. The operations of 925 may be performed according to the methods described herein. In some examples, aspects of the operations of 925 may be performed by a handover component as described with reference to FIGS. 4 through 7.

Figure 10:
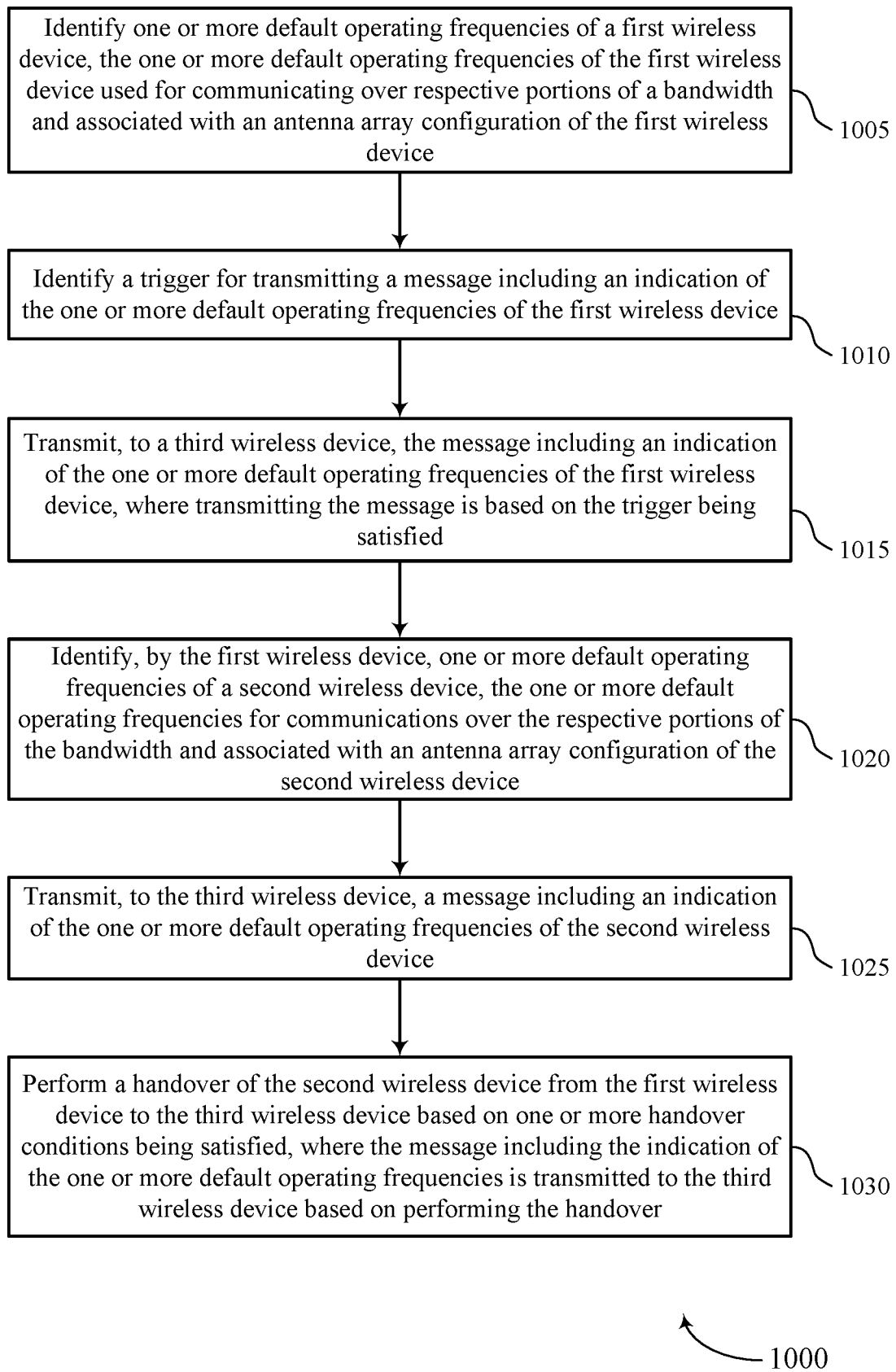

FIG. 10 shows a flowchart illustrating a method 1000 that supports techniques for exchanging ultra-wide bandwidth beamforming information in accordance with aspects of the present disclosure. The operations of method 1000 may be implemented by a wireless device (e.g., a first wireless device) or its components as described herein. For example, the operations of method 1000 may be performed by a communications manager as described with reference to FIGS. 4 through 7. In some examples, a wireless device may execute a set of instructions to control the functional elements of the wireless device to perform the functions described herein. Additionally or alternatively, a wireless device may perform aspects of the functions described herein using special-purpose hardware. In some cases, the wireless device may be an example of a base station 105, an IAB node, a TRP, or another network device. In other examples, the wireless device may be an example of a UE 115, a sidelink node, a repeater, or other device.

At 1005, the first wireless device may identify one or more default operating frequencies of the first wireless device. The one or more default operating frequencies of the first wireless device may be used for communicating over respective portions of a bandwidth (e.g., an ultra-wide bandwidth) and associated with an antenna array configuration of the first wireless device. The operations of 1005 may be performed according to the methods described herein. In some examples, aspects of the operations of 1005 may be performed by a default operating frequency manager as described with reference to FIGS. 4 through 7.

At 1010, the first wireless device may identify a trigger for transmitting a message (e.g., a second message) including an indication of the one or more default operating frequencies of the first wireless device. The operations of 1010 may be performed according to the methods described herein. In some examples, aspects of the operations of 1010 may be performed by a trigger manager as described with reference to FIGS. 4 through 7.

At 1015, the first wireless device may transmit, to a third wireless device, the second message including an indication of the one or more default operating frequencies of the first wireless device, where transmitting the second message may be based on the trigger being satisfied. The operations of 1015 may be performed according to the methods described herein. In some examples, aspects of the operations of 1015 may be performed by a messaging component as described with reference to FIGS. 4 through 7.

At 1020, the first wireless device may identify one or more default operating frequencies of a second wireless device (e.g., a UE), where the one or more default operating frequencies may be for communications over the respective portions of the bandwidth and associated with an antenna array configuration of the second wireless device. The operations of 1020 may be performed according to the methods described herein. In some examples, aspects of the operations of 1020 may be performed by a default operating frequency manager as described with reference to FIGS. 4 through 7.

At 1025, the first wireless device may transmit, to a third wireless device, a message including an indication of the one or more default operating frequencies of the second wireless device. The operations of 1025 may be performed according to the methods described herein. In some examples, aspects of the operations of 1025 may be performed by a messaging component as described with reference to FIGS. 4 through 7.

At 1030, the first wireless device may perform a handover of the second wireless device from the first wireless device to the third wireless device based on one or more handover conditions being satisfied, where the message including the indication of the one or more default operating frequencies is transmitted to the third wireless device based on performing the handover. The operations of 1030 may be performed according to the methods described herein. In some examples, aspects of the operations of 1030 may be performed by a handover component as described with reference to FIGS. 4 through 7.

Figure 11:
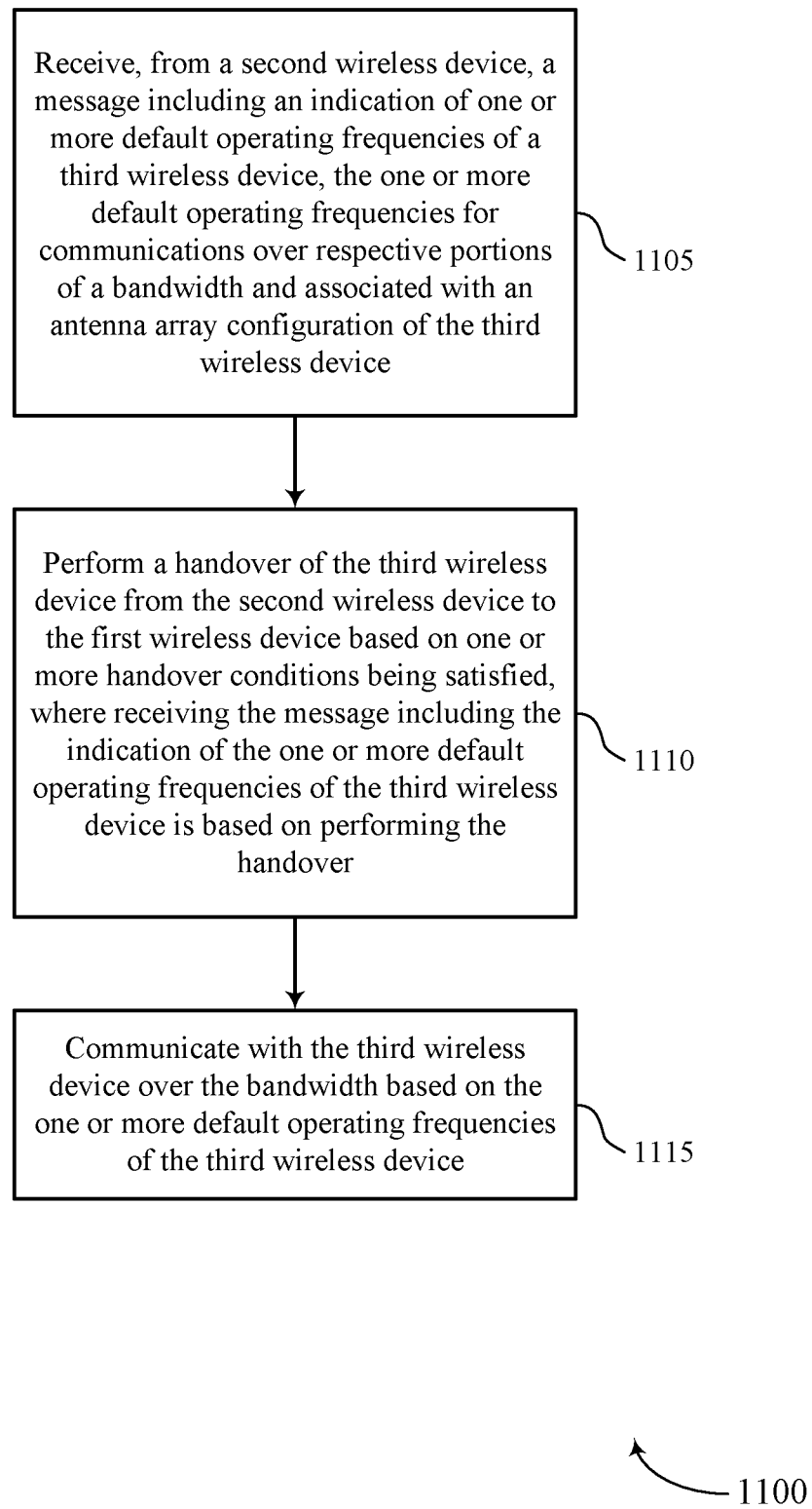

FIG. 11 shows a flowchart illustrating a method 1100 that supports techniques for exchanging ultra-wide bandwidth beamforming information in accordance with aspects of the present disclosure. The operations of method 1100 may be implemented by a wireless device (e.g., a first wireless device) or its components as described herein. For example, the operations of method 1100 may be performed by a communications manager as described with reference to FIGS. 4 through 7. In some examples, a wireless device may execute a set of instructions to control the functional elements of the wireless device to perform the functions described herein. Additionally or alternatively, a wireless device may perform aspects of the functions described herein using special-purpose hardware. In some cases, the wireless device may be an example of a base station 105, an IAB node, a TRP, or another network device. In other examples, the wireless device may be an example of a UE 115, a sidelink node, a repeater, or other device.

At 1105, the first wireless device may receive, from a second wireless device, a message including an indication of one or more default operating frequencies of a third wireless device, the one or more default operating frequencies for communications over respective portions of a bandwidth and associated with an antenna array configuration of the third wireless device. The operations of 1105 may be performed according to the methods described herein. In some examples, aspects of the operations of 1105 may be performed by a messaging component as described with reference to FIGS. 4 through 7.

At 1110, the first wireless device may perform a handover of the third wireless device from the second wireless device to the first wireless device based on one or more handover conditions being satisfied, where receiving the message including the indication of the one or more default operating frequencies of the third wireless device is based on performing the handover. The operations of 1110 may be performed according to the methods described herein. In some examples, aspects of the operations of 1110 may be performed by a handover component as described with reference to FIGS. 4 through 7.

At 1115, the first wireless device may communicate with the third wireless device over the bandwidth based on the one or more default operating frequencies of the third wireless device. The operations of 1115 may be performed according to the methods described herein. In some examples, aspects of the operations of 1115 may be performed by a communication component as described with reference to FIGS. 4 through 7.

Figure 12:
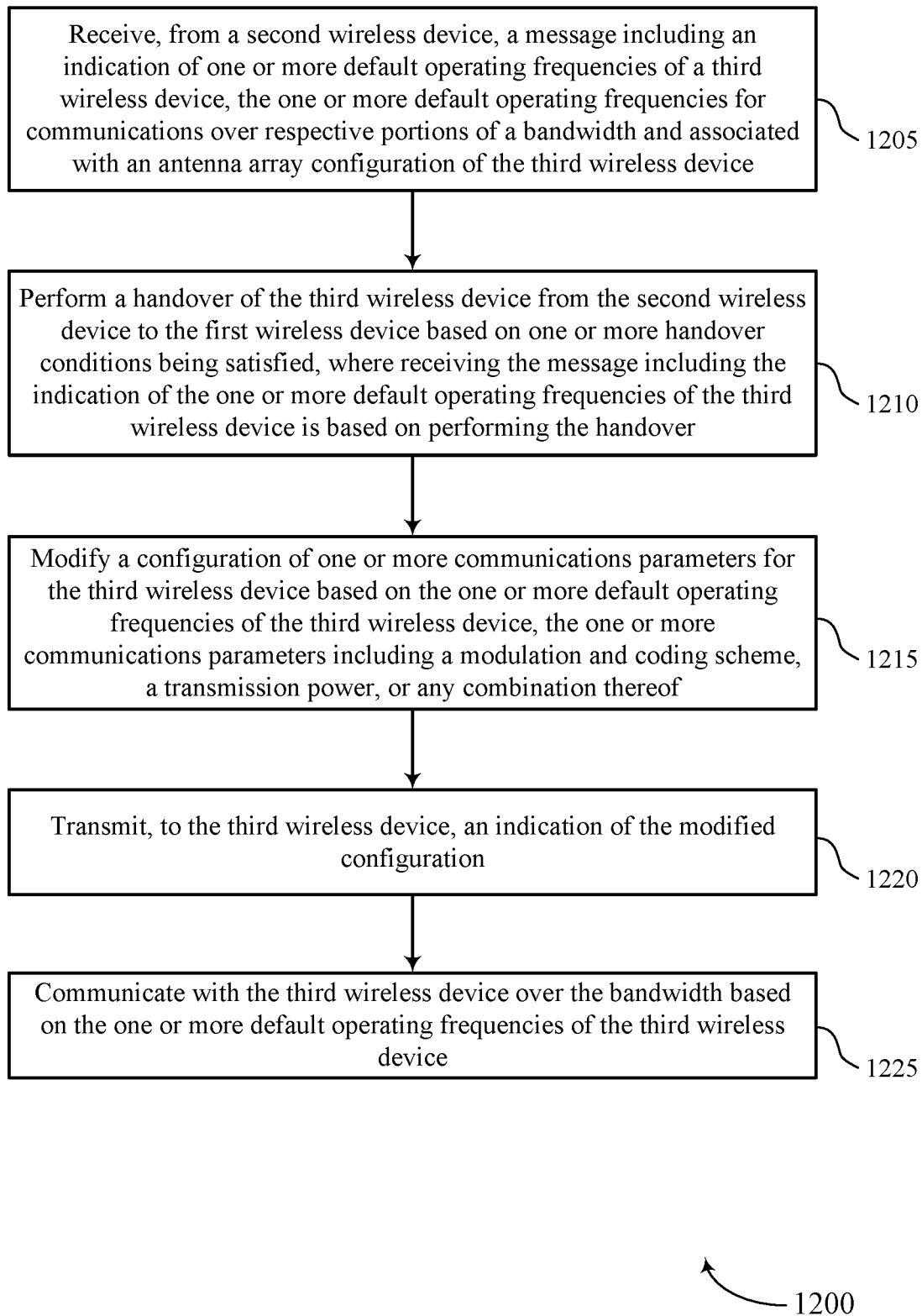

FIG. 12 shows a flowchart illustrating a method 1200 that supports techniques for exchanging ultra-wide bandwidth beamforming information in accordance with aspects of the present disclosure. The operations of method 1200 may be implemented by a wireless device (e.g., a first wireless device) or its components as described herein. For example, the operations of method 1200 may be performed by a communications manager as described with reference to FIGS. 4 through 7. In some examples, a wireless device may execute a set of instructions to control the functional elements of the wireless device to perform the functions described herein. Additionally or alternatively, a wireless device may perform aspects of the functions described herein using special-purpose hardware. In some cases, the wireless device may be an example of a base station 105, an IAB node, a TRP, or another network device. In other examples, the wireless device may be an example of a UE 115, a sidelink node, a repeater, or other device.

At 1205, the first wireless device may receive, from a second wireless device, a message including an indication of one or more default operating frequencies of a third wireless device, the one or more default operating frequencies for communications over respective portions of a bandwidth and associated with an antenna array configuration of the third wireless device. The operations of 1205 may be performed according to the methods described herein. In some examples, aspects of the operations of 1205 may be performed by a messaging component as described with reference to FIGS. 4 through 7.

At 1210, the first wireless device may perform a handover of the third wireless device from the second wireless device to the first wireless device based on one or more handover conditions being satisfied, where receiving the message including the indication of the one or more default operating frequencies of the third wireless device is based on performing the handover. The operations of 1210 may be performed according to the methods described herein. In some examples, aspects of the operations of 1210 may be performed by a handover component as described with reference to FIGS. 4 through 7.

At 1215, the first wireless device may modify a configuration of one or more communications parameters for the third wireless device based on the one or more default operating frequencies of the third wireless device, the one or more communications parameters including an MCS, a transmission power, or any combination thereof. The operations of 1215 may be performed according to the methods described herein. In some examples, aspects of the operations of 1215 may be performed by a configuration manager as described with reference to FIGS. 4 through 7.

At 1220, the first wireless device may transmit, to the third wireless device, an indication of the modified configuration. The operations of 1220 may be performed according to the methods described herein. In some examples, aspects of the operations of 1220 may be performed by a configuration manager as described with reference to FIGS. 4 through 7.

At 1225, the first wireless device may communicate with the third wireless device over the bandwidth based on the one or more default operating frequencies of the third wireless device. The operations of 1225 may be performed according to the methods described herein. In some examples, aspects of the operations of 1225 may be performed by a communication component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first wireless device, comprising: identifying, by the first wireless device, one or more default operating frequencies of a second wireless device, the one or more default operating frequencies for communications over respective portions of a bandwidth and associated with an antenna array configuration of the second wireless device; transmitting, to a third wireless device, a message comprising an indication of the one or more default operating frequencies of the second wireless device; and performing a handover of the second wireless device from the first wireless device to the third wireless device based at least in part on one or more handover conditions being satisfied, wherein the message comprising the indication of the one or more default operating frequencies is transmitted to the third wireless device based at least in part on performing the handover.

Aspect 2: The method of aspect 1, further comprising: identifying one or more default operating frequencies of the first wireless device, the one or more default operating frequencies of the first wireless device used for communicating over the respective portions of the bandwidth and associated with an antenna array configuration of the first wireless device; and transmitting, to the third wireless device, a second message comprising an indication of the one or more default operating frequencies of the first wireless device.

Aspect 3: The method of aspect 2, further comprising: identifying a trigger for transmitting the second message comprising the indication of the one or more default operating frequencies of the first wireless device, wherein transmitting the second message is based at least in part on the trigger being satisfied.

Aspect 4: The method of aspect 3, wherein the trigger comprises a startup event at the first wireless device, activating the first wireless device, restarting the first wireless device, one or more time periods of a predetermined schedule, one or more time periods of a semi-persistent schedule, or any combination thereof.

Aspect 5: The method of any of aspects 2 through 4, further comprising: identifying a configuration of a protocol for exchanging default operating frequencies with the third wireless device, wherein transmitting the second message is based at least in part on the protocol.

Aspect 6: The method of any of aspects 2 through 5, wherein the one or more default operating frequencies of the first wireless device indicate the antenna array configuration of the first wireless device, the antenna array configuration comprising an inter-antenna element spacing of an antenna array having uniformly-spaced antenna elements or non-uniformly-spaced antenna elements, the inter-antenna element spacing of the antenna array is in azimuth, in elevation, or any combination thereof.

Aspect 7: The method of any of aspects 2 through 6, wherein identifying the one or more default operating frequencies of the first wireless device comprises: identifying a first frequency boundary and a second frequency boundary for each default operating frequency of the one or more default operating frequencies of the first wireless device, the first frequency boundary being different from the second frequency boundary, wherein the indication of the one or more default operating frequencies of the first wireless device comprises an indication of at least the first frequency boundary, or the second frequency boundary, or both.

Aspect 8: The method of aspect 7, wherein the first frequency boundary comprises an upper frequency boundary and the second frequency boundary comprises a lower frequency boundary, and one or more frequencies within the upper frequency boundary and the lower frequency boundary provide beamforming performance that satisfies a performance threshold, the performance threshold based at least in part on a signal strength threshold for communications over each of the one or more frequencies.

Aspect 9: The method of any of aspects 1 through 8, wherein performing the handover of the second wireless device comprises: performing a conditional handover of the second wireless device from the first wireless device to the third wireless device, the conditional handover being based at least in part on the one or more handover conditions being satisfied, wherein the message comprises a conditional handover message.

Aspect 10: The method of any of aspects 1 through 9, further comprising: receiving, from the second wireless device, a second message indicating the one or more default operating frequencies of the second wireless device, wherein identifying the one or more default operating frequencies of the second wireless device is based at least in part on receiving the second message.

Aspect 11: The method of aspect 10, wherein the second message comprises an indication of a range of default operating frequencies of the second wireless device.

Aspect 12: The method of any of aspects 1 through 11, further comprising: receiving, from the third wireless device, a third message comprising an indication of one or more default operating frequencies of the third wireless device; and identifying the one or more default operating frequencies of the third wireless device based at least in part on the third message, wherein the one or more default operating frequencies of the third wireless device are associated with an antenna array configuration of the third wireless device, or one or more carrier frequencies associated with an analog beamforming codebook of the third wireless device, or a frequency band from a set of frequency bands, or a channel from a set of channels, or any combination thereof.

Aspect 13: The method of any of aspects 1 through 12, wherein each default operating frequency of the one or more default operating frequencies of the second wireless device comprises a frequency such that substantially half of a wavelength corresponding to the frequency is substantially equal to a spacing between two or more antenna elements of an antenna array of the second wireless device.

Aspect 14: The method of aspect 13, wherein the spacing between the two or more antenna elements of the antenna array of the second wireless device is within an upper threshold and a lower threshold that are associated with substantially half of the wavelength of the frequency.

Aspect 15: A method for wireless communication at a first wireless device, comprising: receiving, from a second wireless device, a message comprising an indication of one or more default operating frequencies of a third wireless device, the one or more default operating frequencies for communications over respective portions of a bandwidth and associated with an antenna array configuration of the third wireless device; performing a handover of the third wireless device from the second wireless device to the first wireless device based at least in part on one or more handover conditions being satisfied, wherein receiving the message comprising the indication of the one or more default operating frequencies of the third wireless device is based at least in part on performing the handover; and communicating with the third wireless device over the bandwidth based at least in part on the one or more default operating frequencies of the third wireless device.

Aspect 16: The method of aspect 15, further comprising: modifying a configuration of one or more communications parameters for the third wireless device based at least in part on the one or more default operating frequencies of the third wireless device, the one or more communications parameters comprising a MCS, a transmission power, or any combination thereof; and transmitting, to the third wireless device, an indication of the modified configuration.

Aspect 17: The method of any of aspects 15 through 16, further comprising: identifying one or more default operating frequencies of the first wireless device, the one or more default operating frequencies of the first wireless device used for communicating over the respective portions of the bandwidth and associated with an antenna array configuration of the first wireless device; and transmitting, to the second wireless device, a second message indicating the one or more default operating frequencies of the first wireless device.

Aspect 18: The method of aspect 17, further comprising: identifying a trigger for transmitting the second message comprising the indication of the one or more default operating frequencies of the first wireless device, wherein transmitting the second message is based at least in part on the trigger being satisfied.

Aspect 19: The method of aspect 18, wherein the trigger comprises a startup event at the first wireless device, activating the first wireless device, restarting the first wireless device, one or more time periods of a predetermined schedule, one or more time periods of a semi-persistent schedule, or any combination thereof.

Aspect 20: The method of any of aspects 17 through 19, further comprising: identifying a configuration of a protocol for exchanging default operating frequencies with the second wireless device, wherein transmitting the second message is based at least in part on the protocol.

Aspect 21: The method of any of aspects 17 through 20, wherein the one or more default operating frequencies of the first wireless device indicate the antenna array configuration of the first wireless device, the antenna array configuration comprising an inter-antenna element spacing of an antenna array having uniformly-spaced antenna elements or non-uniformly-spaced antenna elements, the inter-antenna element spacing of the antenna array is in azimuth, in elevation, or any combination thereof.

Aspect 22: The method of any of aspects 17 through 21, wherein identifying the one or more default operating frequencies of the first wireless device comprises: identifying a first frequency boundary and a second frequency boundary for each default operating frequency of the one or more default operating frequencies of the first wireless device, the first frequency boundary being different from the second frequency boundary, wherein the indication of the one or more default operating frequencies of the first wireless device comprises an indication of at least the first frequency boundary, or the second frequency boundary, or both.

Aspect 23: The method of aspect 22, wherein the first frequency boundary comprises an upper frequency boundary and the second frequency boundary comprises a lower frequency boundary, and one or more frequencies within the upper frequency boundary and the lower frequency boundary provide beamforming performance that satisfies a performance threshold, the performance threshold based at least in part on a signal strength threshold for communications over each of the one or more frequencies.

Aspect 24: The method of any of aspects 15 through 23, wherein performing the handover of the third wireless device comprises: performing a conditional handover of the third wireless device from the second wireless device to the first wireless device, the conditional handover based at least in part on the one or more handover conditions being satisfied, wherein the message comprises a conditional handover message.

Aspect 25: The method of any of aspects 15 through 24, further comprising: receiving, from the third wireless device, a second message comprising an indication of the one or more default operating frequencies of the third wireless device; and identifying the one or more default operating frequencies of the third wireless device based at least in part on receiving the second message.

Aspect 26: The method of aspect 25, wherein the second message comprises an indication of a range of default operating frequencies of the third wireless device.

Aspect 27: The method of any of aspects 15 through 26, further comprising: receiving, from the second wireless device, a third message comprising an indication of one or more default operating frequencies of the second wireless device; and identifying the one or more default operating frequencies of the second wireless device based at least in part on the third message, wherein the one or more default operating frequencies of the second wireless device are associated with an antenna array configuration of the second wireless device, or one or more carrier frequencies associated with an analog beamforming codebook of the second wireless device, or a frequency band from a set of frequency bands, or a channel from a set of channels, or any combination thereof.

Aspect 28: The method of any of aspects 15 through 27, wherein each default operating frequency of the one or more default operating frequencies of the third wireless device comprises a frequency such that substantially half of a wavelength corresponding to the frequency is substantially equal to a spacing between two or more antenna elements of an antenna array of the third wireless device.

Aspect 29: An apparatus for wireless communication at a first wireless device, comprising a processor; memory coupled with the processor; and instructions stored in the memory and executable by the processor to cause the apparatus to perform a method of any of aspects 1 through 14.

Aspect 30: An apparatus for wireless communication at a first wireless device, comprising at least one means for performing a method of any of aspects 1 through 14.

Aspect 31: A non-transitory computer-readable medium storing code for wireless communication at a first wireless device, the code comprising instructions executable by a processor to perform a method of any of aspects 1 through 14.

Aspect 32: An apparatus for wireless communication at a first wireless device, comprising a processor; memory coupled with the processor; and instructions stored in the memory and executable by the processor to cause the apparatus to perform a method of any of aspects 15 through 28.

Aspect 33: An apparatus for wireless communication at a first wireless device, comprising at least one means for performing a method of any of aspects 15 through 28.

Aspect 34: A non-transitory computer-readable medium storing code for wireless communication at a first wireless device, the code comprising instructions executable by a processor to perform a method of any of aspects 15 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:
    transmitting, to a third wireless device, a message comprising an indication of one or more default operating frequencies of a second wireless device, the one or more default operating frequencies above a threshold operating frequency of 52.6 gigahertz (GHz) and used for communications over respective portions of a bandwidth, wherein the one or more default operating frequencies are associated with an antenna array configuration of the second wireless device; and
    performing a handover of the second wireless device from the first wireless device to the third wireless device based at least in part on one or more handover conditions being satisfied, wherein the message comprising the indication of the one or more default operating frequencies is transmitted to the third wireless device based at least in part on performing the handover.

2. The method of claim 1, further comprising:
    identifying one or more default operating frequencies of the first wireless device, the one or more default operating frequencies of the first wireless device above the threshold operating frequency and used for communicating over the respective portions of the bandwidth, wherein the one or more default operating frequencies of the first wireless device are associated with an antenna array configuration of the first wireless device; and transmitting, to the third wireless device, a second message comprising an indication of the one or more default operating frequencies of the first wireless device.

3. The method of claim 2, further comprising:
identifying a trigger for transmitting the second message comprising the indication of the one or more default operating frequencies of the first wireless device, wherein transmitting the second message is based at least in part on the trigger being satisfied.

4. The method of claim 3, wherein the trigger comprises a startup event at the first wireless device, activating the first wireless device, restarting the first wireless device, one or more time periods of a predetermined schedule, one or more time periods of a semi-persistent schedule, or any combination thereof.

5. The method of claim 2, further comprising:
identifying a configuration of a protocol for exchanging default operating frequencies with the third wireless device, wherein transmitting the second message is based at least in part on the protocol.

6. The method of claim 2, wherein the one or more default operating frequencies of the first wireless device indicate the antenna array configuration of the first wireless device, the antenna array configuration comprising an inter-antenna element spacing of an antenna array having uniformly-spaced antenna elements or non-uniformly-spaced antenna elements, wherein the inter-antenna element spacing of the antenna array is in azimuth, in elevation, or any combination thereof.

7. The method of claim 2, wherein identifying the one or more default operating frequencies of the first wireless device comprises:
identifying a first frequency boundary and a second frequency boundary for each default operating frequency of the one or more default operating frequencies of the first wireless device, the first frequency boundary being different from the second frequency boundary, wherein the indication of the one or more default operating frequencies of the first wireless device comprises an indication of at least the first frequency boundary, or the second frequency boundary, or both.

8. The method of claim 7, wherein the first frequency boundary comprises an upper frequency boundary and the second frequency boundary comprises a lower frequency boundary, and wherein one or more frequencies within the upper frequency boundary and the lower frequency boundary provide beamforming performance that satisfies a performance threshold, the performance threshold based at least in part on a signal strength threshold for communications over each of the one or more frequencies.

9. The method of claim 1, wherein performing the handover of the second wireless device comprises:
performing a conditional handover of the second wireless device from the first wireless device to the third wireless device, the conditional handover being based at least in part on the one or more handover conditions being satisfied, wherein the message comprises a conditional handover message.

10. The method of claim 1, further comprising:
receiving, from the second wireless device, a second message indicating the one or more default operating frequencies of the second wireless device, wherein identifying the one or more default operating frequencies of the second wireless device is based at least in part on receiving the second message.

11. The method of claim 10, wherein the second message comprises an indication of a range of default operating frequencies of the second wireless device.

12. The method of claim 1, further comprising:
receiving, from the third wireless device, a third message comprising an indication of one or more default operating frequencies of the third wireless device, the one or more default operating frequencies of the third wireless device above the threshold operating frequency; and
identifying the one or more default operating frequencies of the third wireless device based at least in part on the third message, wherein the one or more default operating frequencies of the third wireless device are associated with an antenna array configuration of the third wireless device, or one or more carrier frequencies associated with an analog beamforming codebook of the third wireless device, or a frequency band from a set of frequency bands, or a channel from a set of channels, or any combination thereof.

13. The method of claim 1, wherein each default operating frequency of the one or more default operating frequencies of the second wireless device comprises a frequency such that substantially half of a wavelength corresponding to the frequency is substantially equal to a spacing between two or more antenna elements of an antenna array of the second wireless device.

14. The method of claim 13, wherein the spacing between the two or more antenna elements of the antenna array of the second wireless device is within an upper threshold and a lower threshold that are associated with substantially half of the wavelength of the frequency.

15. A method for wireless communication at a first wireless device, comprising:
receiving, from a second wireless device, a message comprising an indication of one or more default operating frequencies of a third wireless device, the one or more default operating frequencies above a threshold operating frequency of 52.6 gigahertz (GHz) and used for communications over respective portions of a bandwidth, wherein the one or more default operating frequencies are associated with an antenna array configuration of the third wireless device;
performing a handover of the third wireless device from the second wireless device to the first wireless device based at least in part on one or more handover conditions being satisfied, wherein receiving the message comprising the indication of the one or more default operating frequencies of the third wireless device is based at least in part on performing the handover; and
communicating with the third wireless device over the bandwidth based at least in part on the one or more default operating frequencies of the third wireless device.

16. The method of claim 15, further comprising:
modifying a configuration of one or more communications parameters for the third wireless device based at least in part on the one or more default operating frequencies of the third wireless device, the one or more communications parameters comprising a modulation and coding scheme, a transmission power, or any combination thereof; and transmitting, to the third wireless device, an indication of the modified configuration.

17. The method of claim 15, further comprising:

identifying one or more default operating frequencies of the first wireless device, the one or more default operating frequencies of the first wireless device above the threshold operating frequency and used for communicating over the respective portions of the bandwidth, wherein the one or more default operating frequencies of the first wireless device are associated with an antenna array configuration of the first wireless device; and transmitting, to the second wireless device, a second message indicating the one or more default operating frequencies of the first wireless device.

18. The method of claim 17, further comprising:

identifying a trigger for transmitting the second message comprising the indication of the one or more default operating frequencies of the first wireless device, wherein transmitting the second message is based at least in part on the trigger being satisfied.

19. The method of claim 18, wherein the trigger comprises a startup event at the first wireless device, activating the first wireless device, restarting the first wireless device, one or more time periods of a predetermined schedule, one or more time periods of a semi-persistent schedule, or any combination thereof.

20. The method of claim 17, further comprising:

identifying a configuration of a protocol for exchanging default operating frequencies with the second wireless device, wherein transmitting the second message is based at least in part on the protocol.

21. The method of claim 17, wherein the one or more default operating frequencies of the first wireless device indicate the antenna array configuration of the first wireless device, the antenna array configuration comprising an inter-antenna element spacing of an antenna array having uniformly-spaced antenna elements or non-uniformly-spaced antenna elements, wherein the inter-antenna element spacing of the antenna array is in azimuth, in elevation, or any combination thereof.

22. The method of claim 17, wherein identifying the one or more default operating frequencies of the first wireless device comprises:

identifying a first frequency boundary and a second frequency boundary for each default operating frequency of the one or more default operating frequencies of the first wireless device, the first frequency boundary being different from the second frequency boundary, wherein the indication of the one or more default operating frequencies of the first wireless device comprises an indication of at least the first frequency boundary, or the second frequency boundary, or both.

23. The method of claim 22, wherein the first frequency boundary comprises an upper frequency boundary and the second frequency boundary comprises a lower frequency boundary, and wherein one or more frequencies within the upper frequency boundary and the lower frequency boundary provide beamforming performance that satisfies a performance threshold, the performance threshold based at least in part on a signal strength threshold for communications over each of the one or more frequencies.

24. The method of claim 15, wherein performing the handover of the third wireless device comprises:

performing a conditional handover of the third wireless device from the second wireless device to the first wireless device, the conditional handover based at least in part on the one or more handover conditions being satisfied, wherein the message comprises a conditional handover message.

25. The method of claim 15, further comprising:

receiving, from the third wireless device, a second message comprising an indication of the one or more default operating frequencies of the third wireless device; and identifying the one or more default operating frequencies of the third wireless device based at least in part on receiving the second message.

26. The method of claim 25, wherein the second message comprises an indication of a range of default operating frequencies of the third wireless device.

27. The method of claim 15, further comprising:

receiving, from the second wireless device, a third message comprising an indication of one or more default operating frequencies of the second wireless device; and identifying the one or more default operating frequencies of the second wireless device based at least in part on the third message, wherein the one or more default operating frequencies of the second wireless device are associated with an antenna array configuration of the second wireless device, or one or more carrier frequencies associated with an analog beamforming codebook of the second wireless device, or a frequency band from a set of frequency bands, or a channel from a set of channels, or any combination thereof.

28. The method of claim 15, wherein each default operating frequency of the one or more default operating frequencies of the third wireless device comprises a frequency such that substantially half of a wavelength corresponding to the frequency is substantially equal to a spacing between two or more antenna elements of an antenna array of the third wireless device.

29. An apparatus for wireless communication at a first wireless device, comprising:

a processor, memory coupled with the processor; and instructions stored in the memory and executable by the processor to cause the apparatus to:

transmit, to a third wireless device, a message comprising an indication of one or more default operating frequencies of a second wireless device, the one or more default operating frequencies above a threshold operating frequency of 52.6 gigahertz (GHz) and used for communications over respective portions of a bandwidth, wherein the one or more default operating frequencies are associated with an antenna array configuration of the second wireless device; and perform a handover of the second wireless device from the first wireless device to the third wireless device based at least in part on one or more handover conditions being satisfied, wherein the message comprising the indication of the one or more default operating frequencies is transmitted to the third wireless device based at least in part on performing the handover.

30. An apparatus for wireless communication at a first wireless device, comprising:

a processor, memory coupled with the processor; and instructions stored in the memory and executable by the processor to cause the apparatus to:
- receive, from a second wireless device, a message comprising an indication of one or more default operating frequencies of a third wireless device, the one or more default operating frequencies above a threshold operating frequency of 52.6 gigahertz (GHz) and used for communications over respective portions of a bandwidth, wherein the one or more default operating frequencies are associated with an antenna array configuration of the third wireless device;
- perform a handover of the third wireless device from the second wireless device to the first wireless device based at least in part on one or more handover conditions being satisfied, wherein receiving the message comprising the indication of the one or more default operating frequencies of the third wireless device is based at least in part on performing the handover; and
- communicate with the third wireless device over the bandwidth based at least in part on the one or more default operating frequencies of the third wireless device.

\* \* \* \* \*